(12) United States Patent
Siomina et al.

(10) Patent No.: US 9,374,802 B2
(45) Date of Patent: Jun. 21, 2016

(54) METHODS AND ARRANGEMENTS IN A CELLULAR RADIO COMMUNICATION SYSTEM

(75) Inventors: Iana Siomina, Solna (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/982,565

(22) PCT Filed: May 11, 2011

(86) PCT No.: PCT/SE2011/050598
§ 371 (c)(1),
(2), (4) Date: Jul. 30, 2013

(87) PCT Pub. No.: WO2012/108801
PCT Pub. Date: Aug. 16, 2012

(65) Prior Publication Data
US 2013/0310077 A1 Nov. 21, 2013

Related U.S. Application Data

(60) Provisional application No. 61/441,370, filed on Feb. 10, 2011.

(51) Int. Cl.
*H04W 68/00* (2009.01)
*H04W 64/00* (2009.01)
*H04W 4/02* (2009.01)
(52) U.S. Cl.
CPC ............. *H04W 64/006* (2013.01); *H04W 4/02* (2013.01); *H04W 64/00* (2013.01)
(58) Field of Classification Search
CPC ...... H04W 4/02; H04W 64/00; H04W 64/006
USPC ........... 455/456.1–457, 420–422.1, 436, 444, 455/67.11, 452.1, 452.2, 41.1–41.2, 552.1
See application file for complete search history.

(56) References Cited

U.S. PATENT DOCUMENTS

| 2004/0259575 | A1 | 12/2004 | Perez-Breva et al. |
| 2006/0240843 | A1* | 10/2006 | Spain et al. ................ 455/456.1 |
| 2013/0028231 | A1* | 1/2013 | Zhang et al. .................. 370/329 |

FOREIGN PATENT DOCUMENTS

WO 2007086784 A1 8/2007

OTHER PUBLICATIONS

3rd Generation Partnership Project. "3GPP TS 36.305 V9.5.0." 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9). Dec. 17, 2010, pp. 1-51.

*Primary Examiner* — Babar Sarwar
(74) *Attorney, Agent, or Firm* — Murphy, Bilak & Homiller, PLLC

(57) ABSTRACT

A user equipment (120), a first radio network node (130) and a positioning node (110) are comprised in a Long Term Evolution system (100). The user equipment (120) receives (2000, 2010) a request for path loss related information. The user equipment (120) estimates (2020) and sends (2030, 2040) the path loss related information. Moreover, the first radio network node (110, 130) sends (2010, 2060) a request for the path loss related information. The first radio network node (110, 130) receives (2030) the path loss related information. Furthermore, the positioning node (110) sends (2000, 2050) a request for the path loss related information. The positioning node (110) receives (2040, 2080) the path loss related information. In some examples, the positioning node (110) associates (2110) the path loss related information to at least one cell area description, thereby creating a database of cell area descriptions and path loss related information associated thereto.

21 Claims, 12 Drawing Sheets

--- RSRP Macro
........ RSRP Pico
——— RSRP Pico + delta

CR1 – conventional cell range: RSRP Pico
CR2 – expanded cell range
RSPR Pico + delta

METHODS AND ARRANGEMENTS IN A CELLULAR RADIO COMMUNICATION SYSTEM

TECHNICAL FIELD

The present disclosure relates to the field of telecommunication. Furthermore, the present disclosure relates to a method in a user equipment for providing path loss related information to a location service. It is also herein disclosed a method in a first radio network node and a positioning node, as well as a first radio network node and a positioning node, for handling path loss related information to be used by a location service. More particularly, the present disclosure relates to methods and network nodes for measurement of path loss, methods and network nodes for signalling of path loss information, methods and network nodes for determining position information, and methods and network nodes for managing path loss information for the purpose of determining a position.

BACKGROUND

A known cellular telecommunication system comprises at least a base station and a user equipment (UE). The base station and/or the user equipment are/is configured to use varying transmit power e.g. in order to reduce power consumption and to coordinate interference in the wireless network. As an example, cell range control techniques, mentioned further below, may cause the transmit power of a base station to vary. In some situations, this may lead to unforeseen problems.

The possibility of identifying user geographical location in wireless networks has enabled a large variety of commercial and non-commercial services, e.g., navigation assistance, social networking, location-aware advertising, and emergency calls. Different services may have different positioning accuracy requirements imposed by the application. In addition, some regulatory requirements on the positioning accuracy for basic emergency services exist in some countries, i.e. Federal Communications Commission (FCC) E911 in US.

Some known positioning methods rely on a database comprising information about cell areas. The information about cell areas is herein referred to as cell area description. Due to varying transmit power, the database may be corrupted and/or unreliable. As a result, the positioning methods may not provide a sufficiently accurate determination of a position of, for example, a user equipment.

In many environments, the position can be accurately estimated by using positioning methods based on GPS (Global Positioning System), which is, however, known to be associated with a cost due to a higher device complexity, longer measurement time, and more energy consumption. Nowadays networks have also often a possibility to assist UEs in order to improve the terminal receiver sensitivity and GPS startup performance (Assisted-GPS positioning, or A-GPS). GPS or A-GPS receivers, however, may not necessarily be available in all wireless terminals. Furthermore, GPS is known to often fail in indoor environments and urban canyons. There are complementary terrestrial positioning methods, e.g. Observed Time Difference of Arrival (OTDOA) in Long Term Evolution (LTE). Nevertheless, methods with lower accuracy such as those exploiting cell identities (Cell ID) or fingerprints are still of high importance and may become more important with dense wireless network deployments since the coverage area of low power radio nodes is typically small and the resulting positioning results may therefore be quite accurate and at the same time achievable at a very short response time. However, present positioning methods rely on that the transmit power of, for example, a low power node is constant. As mentioned in the foregoing, cell range control techniques, which are frequently employed for low power nodes, implies a varying transmit power. Thereby, present positioning methods become less accurate. Hence, there is a need for improvement.

Varying transmit power may result from for example cell range control.

Cell range control techniques according to prior art may be implemented by changing transmit power of a radio network node, such as an eNB or evolved-NodeB, or by changing cell selection offset at a receiver, such as a user equipment.

In the following, cell range control by changing the transmit power of a radio network node is explained. The maximum transmit power of a radio base station may vary in time per frequency carrier and Radio Access Technology (RAT) for various reasons, which results in non-uniquely defined areas describing the service area of a cell. Some of the examples are:

Energy saving operation of a radio node,
Transmit power restrictions for particular carrier frequencies and bands,
Power sharing among multiple RATs in a multi-RAT or multi-standard radio base station,
Power sharing among frequency carriers,
Power sharing among frequency bands,
Load balancing,
Capacity boosting during traffic-intensive hours and/or hotspot areas by turning ON some radio nodes or increasing power of some radio nodes, etc., and
Self Optimizing Network (SON) operation controlling cell coverage and coordinating interference in the network.

In the simplest case, the maximum transmit power of a radio node may be defined statically. However, in practice, it may also be defined in a semi-static or dynamic manner. Furthermore, different power levels may apply on different physical signals (e.g. synchronization signals or reference signals) and different channels (e.g. traffic channels and broadcast channels).

SUMMARY

Hence, there is a need for improved signalling for use by, e.g., positioning methods and/or improved positioning methods and/or improved databases.

An object is, therefore, how to improve positioning methods in at least an LTE system and to improve databases for use with such positioning methods.

According to one aspect, this object is achieved by a method in a user equipment for providing path loss related information to a location service. The user equipment is served by a first radio network node. The user equipment and the first radio network node are comprised in a Long Term Evolution system. The user equipment receives a request for path loss related information. The request relates to requesting information for use by the location service. The user equipment estimates the path loss related information. Then, the user equipment sends the path loss related information, thereby providing the path loss related information to the location service.

According to another aspect, this object is achieved by a user equipment for providing path loss related information to a location service. The user equipment is configured to be served by a first radio network node. The user equipment and the first radio network node are configured for being comprised in a Long Term Evolution system. The user equipment comprises a receiver configured to receive a request for path loss related information. The request relates to requesting information for use by the location service. The user equipment further comprises a processing circuit configured to estimate the path loss related information. Furthermore, the user equipment comprises a transmitter configure to send the path loss related information, thereby providing the path loss related information to the location service.

According to a further aspect, this object is achieved by a method in a first radio network node for handling path loss related information to be used by a location service. The first radio network node is comprised in a Long Term Evolution system. The first radio network node sends a request for the path loss related information. The request relates to requesting information for use by the location service. The first radio network node receives the path loss related information.

According to yet another aspect, this object is achieved by a first radio network node for handling path loss related information to be used by a location service. The first radio network node is configured for being comprised in a Long Term Evolution system. The first radio network node comprises a transmitter configured to send a request for the path loss related information. The request relates to requesting information for use by the location service. Furthermore, the first radio network node comprises a receiver configured to receive the path loss related information.

According to a still further aspect, this object is achieved by method in a positioning node for handling path loss related information to be used by a location service. The positioning node is comprised in a Long Term Evolution, LTE, system. The positioning node sends a request for the path loss related information. The request relates to requesting information for use by the location service. The positioning node receives the path loss related information.

According to yet another aspect, this object is achieved by a positioning node for handling path loss related information to be used by location service. The positioning node is configured for being comprised in a Long Term Evolution system. The positioning node comprises a transmitter configured to send a request for the path loss related information. The request relates to requesting information for use by the location service. Moreover, the positioning node comprises a receiver configured to receive the path loss related information.

The location service shall be understood in a general sense, i.e. as a location-related service which also includes at least one of a positioning service and a location based service (LBS).

By signalling of the path loss related information, i.e. sending and receiving of path loss related information, it is made possible to take into account path loss related information when determining a position of for example a user equipment. Thanks to that the path loss related information is invariant with respect to transmit power as compared to signal strength, path loss related information provides accurate information even in radio communication systems where the transmit power varies within wide ranges. Hence, positioning methods may use the path loss related information to improve positioning accuracy.

According to an aspect, there is provided methods and network nodes for measurement of path loss. The network node may be a radio network node, such as an eNB. Furthermore, the network node may be a user equipment.

According to another aspect, there is provided methods and network nodes for signalling of path loss information. The network node may be a radio network node, such as an eNB. Furthermore, the network node may be a user equipment. A method in a positioning node for receiving path loss information is also provided.

According to a further aspect, there is provided methods and network nodes for determining position information. The network node may be a positioning node.

According to yet another aspect, there is provided methods and network nodes for managing path loss information for the purpose of determining position information. The network node may be a positioning node An advantage according to embodiments disclosed herein is that use of path loss information for positioning is enabled by defining signalling for both control and user plane.

Another advantage according to embodiments disclosed herein may be that databases for use with positioning methods are adapted for scenarios in which transmit power may vary.

A further advantage may be that path loss measurements are introduced. These measurements may be exploited, e.g., for positioning, tracking area update, minimizing drive tests (MDT), Self Organizing Networks (SON), inter-cell interference coordination (ICIC), Radio Resource Management (RRM), enhanced planning and operation of heterogeneous networks.

New algorithms for cell ID based positioning methods, i.e. positioning methods using cell IDs and relying on cell area descriptions, in general and for Adaptive enhanced cell ID (AECID) positioning methods in particular for enabling positioning when the transmit power of radio nodes varies and/or cell selection/reselection parameters may vary in time and by UEs.

A still other advantage may be that enhanced positioning performance in heterogeneous environments may be obtained.

Yet another advantage is that inter-RAT signalling of path loss is made possible. Moreover, information that enables inter-RAT path loss estimation is made available to a radio network node comprised in an LTE system.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
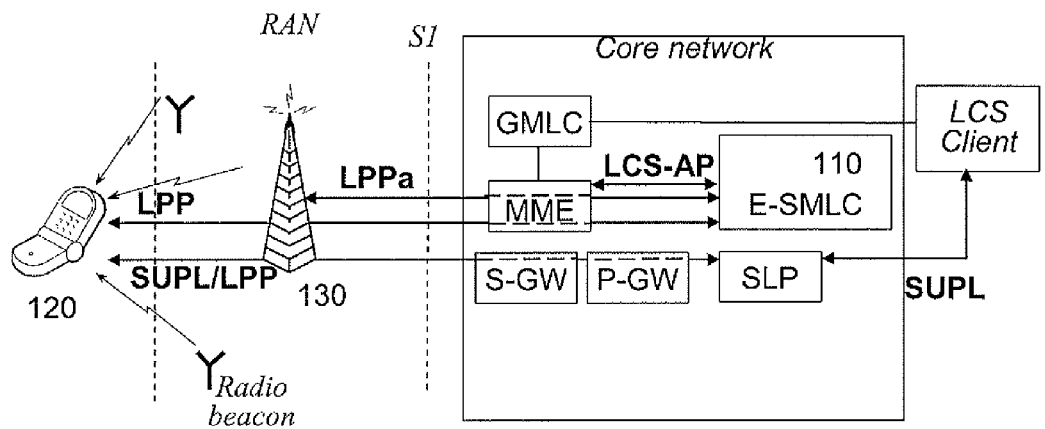
FIG. 1 show an exemplifying positioning architecture in LTE Rel-9/Rel-10.

To begin, a brief description of path loss estimation in LTE is provided.

Path loss (or path attenuation) is the reduction in power density (attenuation) of an electromagnetic wave as it propagates through space. Path loss may be estimated as a difference, expressed in a number of dBs, between for example the power of signals transmitted by a user equipment and the power of these signals when received at a radio base station, or vice versa.

Path Loss Estimation by UE

In a known LTE system, a UE has to estimate path loss for the serving cell based on DL reference signal measurements to determine its uplink transmission power, e.g., for Physical Uplink Shared Channel (PUSCH) and Physical Uplink Control Channel (PUCCH) [3GPP TS 36.213]. The downlink path loss estimate calculated in the UE for serving cell (in dB) is defined as (referenceSignalPower—higher layer filtered Reference Signal Received Power, RSRP), where referenceSignalPower may be provided by higher layers via Radio Resource Control (RRC) signaling, RSRP is a UE measurement defined in [3GPP TS 26.214] for the reference serving cell, and the higher-layer filter configuration is defined in [3GPP TS 36.331].

The path loss estimated by the UE is used for defining the UE transmit power for uplink PUSCH and PUCCH transmissions, and it is not signalled to other nodes. Therefore, the accuracy of the path loss estimation is also left to the UE implementation.

Path loss estimation by a radio network node, such as eNB, is explained in the following.

The UE may report power headroom (PH), expressed in dB. The PH reporting procedure is used to provide the serving eNodeB with information about the difference between the nominal UE maximum transmit power and the estimated power for Uplink-Shared Channel (UL-SCH) transmission per activated Serving Cell and also with information about the difference between the nominal UE maximum power and the estimated power for UL-SCH and PUCCH transmission on the serving cell, such as a PCell using another 3GPP terminology e.g. for Carrier Aggregation Networks. A PCell may be a primary cell. The power headroom is estimated only in a subframe where PUSCH is transmitted and may be reported periodically or triggered e.g. by a configured amount of change in UE-estimated path loss (the change of 1, 3 and 6 dB is currently supported) or by activating a new SCell with configured uplink. A SCell may be a secondary cell. If the UE transmit power or at least the maximum transmit power of the UE (e.g. for cell edge UEs) is known to the network node and its received signal strength has been measured, the network may be able to estimate the path loss. PCell and SCell are mentioned as examples for a system capable of carrier aggregation. However, embodiments presented herein may also be applied to systems not capable of carrier aggregation.

The estimated uplink path loss or user equipment power headroom or transmit power cannot be signaled to other network nodes or other radio nodes, even if the signal is measured also at other nodes than the serving-cell node.

Now proceeding with an analysis of problems in prior art. A number of problems have been identified with prior art solutions:

Using signal strength measurements in UEs is not optimal for UE positioning purposes, considering the variation with the transmit power and parameterized cell selection based, e.g., on UE capabilities. Path loss is a quantity that is more invariant and thereby more useful and less ambiguous for UE positioning purposes.

Although path loss related measurements can be made in LTE, there is no way to signal path loss or the quantities needed for it's estimation to the positioning node. Therefore, path loss is not possible to use for positioning in LTE, while it's available in Universal Mobile Telecommunications System (UMTS). This affects at least the following positioning methods:
  positioning methods based on cell identity (CID),
  positioning methods based on enhanced cell identity (E-CID),
  positioning methods based on adaptive enhanced cell identity (AECID),
  positioning methods based on pattern matching,
  Hybrid positioning.

Further, estimation of path loss for non-serving cell is not possible in the UE since the transmit power information is only available for the serving but not other cells The usage of path loss to enhance CID and AECID positioning in LTE is not defined.

No signaling of LTE path loss information to support positioning in GSM (Global System for Mobile Communications) and UMTS is defined, a fact that affects, e.g., AECID positioning. No signalling of path loss from other systems to support positioning in LTE.

The present disclosure relates in general to positioning in wireless communications systems and in particular to positioning in cellular networks with non-uniquely defined cell areas, e.g. due to varying transmit power or different cell selection/reselection approaches. The disclosed methods enhance the prior art positioning techniques and allow for using them in heterogeneous network deployments. Therefore, it is herein disclosed methods at least for:

Measurement of path loss for positioning purposes, preferably in the eNodeB,

Measurement of path loss in the UE for non-serving cells for positioning and with general purpose to be used in the UE or other network nodes Signalling of path loss information within the LTE Radio Access Network (LTE RAN) and core network (CN), in particular to the LTE positioning node, Signalling of path loss information from other RATs to the LTE positioning node, Signalling of the information that enables path loss estimation in the LTE positioning node, Usage of path loss information for CID, E-CID, AECID and hybrid positioning in LTE, Inter-RAT signalling of path loss from/to the LTE network to/from other cellular networks.

Throughout the following description similar reference numerals have been used to denote similar elements, nodes, parts, items or features, when applicable. Dashed lines indicate actions or features that apply for some embodiments.

With reference to FIG. 1, the three key network elements in an LTE positioning architecture are the Location Service (LCS) Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or the network.

Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between evolved Node B (eNodeB) and LCS Server specified only for control-plane positioning procedures, although it still can assist user-plane positioning by querying eNodeBs for information and eNodeB measurements. Secure User Plane Location (SUPL) protocol is used as a transport for LPP in the user plane. LPP has also a possibility to convey LPP extension messages inside LPP messages, e.g. currently Open Mobile Alliance (OMA) LPP extensions are being specified (LPPe) to allow, e.g., for operator-specific assistance data or assistance data that cannot be provided with LPP or to support other position reporting formats or new positioning methods.

A high-level architecture, where the LCS target is a terminal, and the LCS Server is an Evolved Serving Mobile Location Center (Evovled SMLC or E-SMLC) or an SUPL Location Platform (SLP), is also illustrated in FIG. 1. In the Figure, the control plane positioning protocols with E-SMLC as the terminating point are shown in blue, and the user plane positioning protocol is shown in red. SLP may comprise two components, SUPL Positioning Center (SPC) and SUPL Location Center (SLC), which may also reside in different nodes. In an example implementation, SPC has a proprietary interface with E-SMLC, and Llp interface with SLC, and the SLC part of SLP communicates with P-GW (PDN-Gateway) and External LCS Client.

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques.

For example, positioning result may be signaled between:
LCS target and LCS server, e.g. over LPP protocol
Positioning servers (e.g., E-SMLC and SLP), over standardized or proprietary interfaces
Positioning server and other network nodes (e.g., E-SMLC and MME/Gateway Mobile Location Center (GMLC)/Operations and Maintenance (O&M)/SON)
Positioning node and LCS Client (e.g., between E-SMLC and Public Safety Answer Point (PSAP) or between SLP and External LCS Client).

Thanks to the methods disclosed herein, in particular with reference to FIG. 3, FIG. 4, FIG. 6 and FIG. 8, DL path loss information and/or UL path loss information in the positioning node is enabled.

The DL path loss information may be based at least on UE measurements.

The UL path loss information is based at least on eNodeB measurements.

The path loss information is either estimated in the measuring node/device or in another node (which may also be the positioning node), based on the path loss related information.

Moreover, the methods disclosed herein discloses how to manage, such as creating a database, enhanced cell area descriptors based on the path loss information.

Figure 2:
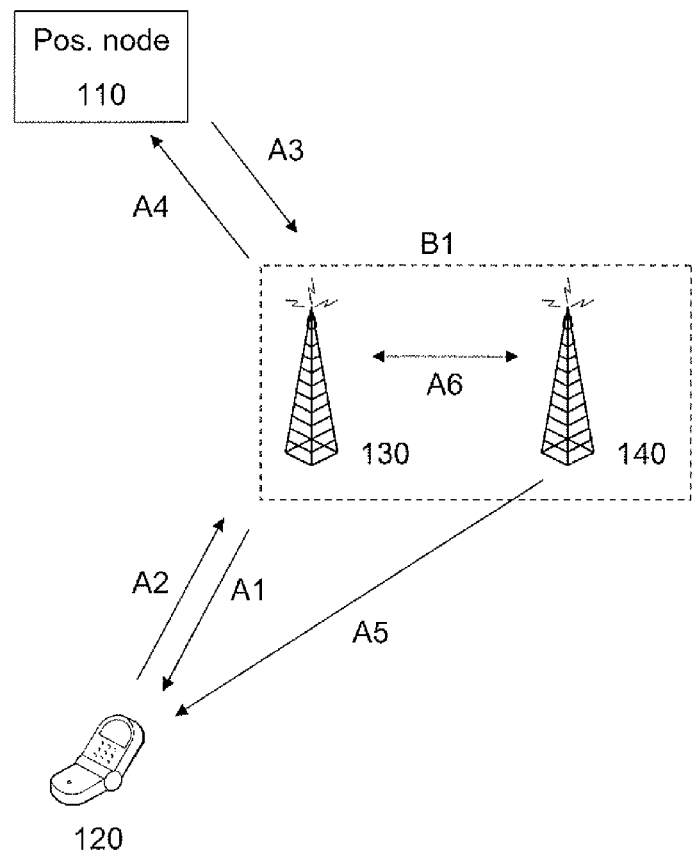
FIG. 2 shows a schematic overview of an exemplifying radio communication system, in which exemplifying methods according to embodiments herein may be implemented.

In FIG. 2, there is shown another exemplifying radio communication system 100, which is similar to the system illustrated in FIG. 1. The radio communication system 100, such as an LTE system 100, comprises a positioning node 110, such as E-SLMC, a user equipment 120, a first radio network node 130 and a second radio network node 140. As mentioned above, similar reference numerals have been used to denote similar nodes or elements also in FIG. 1 and FIG. 2 when applicable.

The first radio network node 130 is an eNodeB of an Evolved-UMTS Terrestrial Radio Access (E-UTRA) RAN, denoted RAN in FIG. 1. In some examples, the first radio network node is comprised in at least the LTE system 100.

The second radio network node 140 is a NodeB of an UTRA RAN. In other examples, the second radio network node 140 may be comprised in the first radio network node 130, i.e. the first radio network node manages at least both E-UTRA and UTRA, e.g. when 130 is a multi-standard radio (MSR) base station (BS) or a BS operating in mixed mode.

A box B1 indicates that the first and second radio network nodes 130, 140 may be co-located, i.e. the box B1 may denote that the first radio network node 130 comprises the second radio network node 140. Expressed differently, the first radio network node 130 is configured to be able to use a first and a second radio access technology.

Arrows A3, A4 indicate that the positioning node 110 is configured for communication with the first radio network node 130, and vice versa. Note, however, that the communication link may be a logical communication link and involve other nodes as well (the same applies to all communication links herein in general, unless otherwise stated).

Arrows A1, A2 indicate that the user equipment 120 is configured for communication with the first radio network node 130, and vice versa.

Arrows A1, A2, A3, A4 indicate that the user equipment 120 is configured for communication with the positioning node 110, and vice versa. Notably, the communication between the positioning node 110 and the user equipment 120 passes via the first radio network node 130.

Before describing exemplifying methods in the user equipment 120, the first radio network node 130 and the positioning node, respectively, it shall be noted that according to embodiments herein, path loss related information comprises one or more of the following items:

- a path loss value. e.g. a path loss value measured in UL or DL,
- a value indicating power of reference signals, the reference signals being transmitted by the first radio network node 130 and being measured by the user equipment 120,
- received signal strength based on which the path loss estimation may be obtained, e.g. the UE may report this measurement to eNodeB which may estimate DL path loss and then further signal the path loss to positioning node,
- information about uplink transmit power of the user equipment 120, e.g. a positioning node needs also to get UL measurements from eNodeB, the positioning node may receive path loss values form eNodeB and leave it to eNodeB how it obtains the UL transmit power of the UE, e.g. by signaling, estimation algorithms and more, and the like.

Furthermore, the path loss related information may comprise information for one or more cells for each of the above items. Thus, according to some embodiments, the path loss related information relates to at least one of: a serving cell, a primary cell, one or more neighbour cells, one or more secondary cells, one or more carrier frequencies, one or more radio access technologies. As an example, the serving cell may be operated by the first radio network node 130. As an example, the primary cell may be operated by the first radio network node 130 and may be used for transmission of control information to the user equipment 120. As an example, one or more neighbour(ing) cells may be operated by the second radio network node. As an example, one or more secondary cell may be operated by the first radio network node when the first radio network node is operates on two or more carrier frequencies. As an example, one or more carrier frequencies may be operated by the first radio network node, or one carrier frequency may be operated by the first radio network node and another carrier frequency may be operated by the second radio network node. As an example, the one or more radio access technologies may be operated by the first radio network node when different radio access technologies are co-located in the first radio network node, or a first radio access technology may be operated by the first radio network node and another radio access technology may be operated by the second radio network node.

It shall be noted that in conjunction with FIG. 3, FIG. 4, FIG. 6 and FIG. 8, the third digit from the left, i.e. abXc, has been kept the same for the same or similar action such as to provide a mapping from one action in one figure to the same or similar action in another figure. Therefore, the reference numerals of the actions do not indicate the order in which the actions are to be performed.

Figure 3:
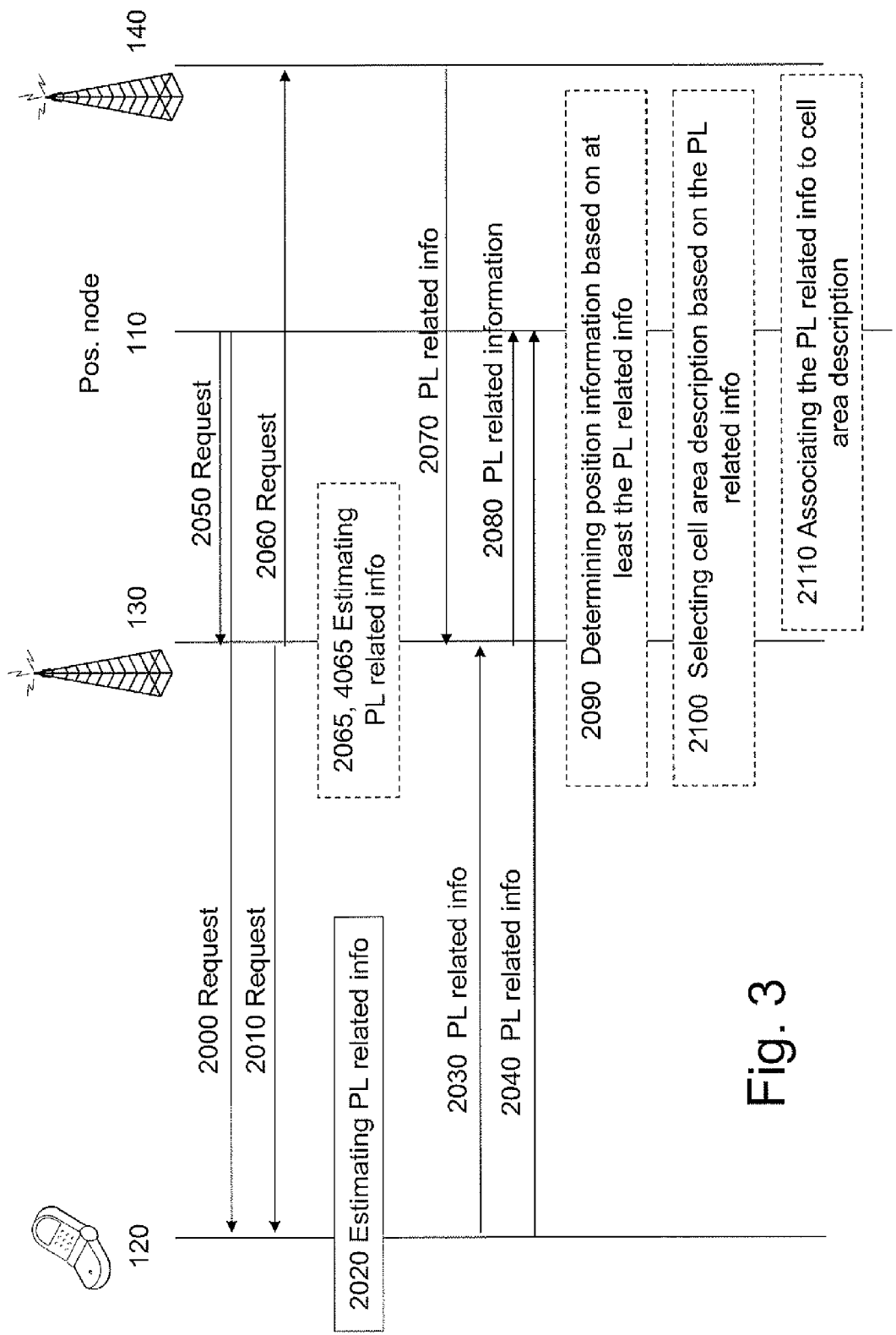
FIG. 3 shows a schematic, combined signalling and flow chart of exemplifying methods in the radio communication system according to FIG. 2.

Now referring to FIG. 3, there is shown a schematic combined signalling and flow chart of exemplifying methods performed by the user equipment 120, the first and second radio network nodes 130, 140 and the positioning node 110, comprised in the LTE system 100 of FIG. 2. The user equipment 120 may perform exemplifying methods for providing path loss related information to a location service. As an example, the user equipment may perform exemplifying methods for providing path loss related information to support, or cooperate with, a location service. In some examples, the location service may be executed by the user equipment. The first radio network node 130 and the positioning node may perform exemplifying methods for handling path loss related information to be used by a location service.

The location service may be a positioning service. The positioning service may be executed by a LCS Client. As an example, the LCS Client may reside in the user equipment 120. As another example, the LCS Client may reside in a computer (not shown). This may for example be the case when a user of the computer would like to know the position of the user equipment 120 or the computer is equipped with a wireless access card.

It may here again be noted that sending and receiving of information, such as path loss related information and the request, between the user equipment 120 and the positioning node 110 passes via the first radio network node 130, which provides a radio communication connection with the user equipment 120. Hence, when it is stated that the user equipment receives information from the positioning node 110 the information passes via the first radio network node 130. Similarly, when it is stated that the user equipment sends information to the positioning node 110 the information passes via the first radio network node 130.

The following actions may be performed. Notably, in some embodiments of the method the order of the actions may differ from what is indicated below.

Action 2000, 2010

The user equipment 120 receives a request for path loss related information. The request relates to requesting information for use by the location service.

In some embodiments of the method, the user equipment 120 receives and the positioning node 110 sends the request. Expressed differently, the request is received the user equipment 120 from a positioning node 110. See action 2000.

In some embodiments of the method, the user equipment 120 receives and the first radio network node 130 sends the request. Expressed differently, the request may be received by the user equipment 120 from the first radio network node 130. See action 2010.

Action 2020

The user equipment 120 estimates, or determines, the path loss related information. As an example, the user equipment 120 includes information about uplink transmit power of the user equipment 120 into the path loss related information when determining the path loss related information to enable the path loss estimation based on UL measurements.

In some embodiments of the method, the estimating comprises measuring the path loss related information.

In some embodiments of the method, when the path loss related information comprises the path loss value, the measuring of the path loss value is measured with respect to the first radio network node 130, such as the eNodeB. Thus, the path loss value relates to the downlink.

In some embodiments of the method, the measuring of the path loss value is measured with respect to the first radio network node 130 using at least a second radio access technology. These embodiments may, for example, be used when a plurality of radio access technologies are used by the first radio network node or there is a communication between 130 and 140. The user equipment 120 is served by the first radio network node 130 using a first radio access technology that is different from said at least a second radio access technology. As an example the first radio access technology may be E-UTRA at a first frequency band and with transmission in Time Division Duples (TDD) mode and the second radio access technology may be E-UTRA at the first frequency band and with transmission in Frequency Division Duplex (FDD) mode. As another example, the first radio access technology may be E-UTRA at a first frequency band and with transmission in TDD mode and the second radio access technology may be E-UTRA at the first frequency band and with transmission in FDD mode. In yet another example, the second radio access technology may be UMTS Terrestrial Radio Access (UTRA). In this manner, path loss related information may be obtained while using the first radio access technology while the path loss related information may be applied while using the second radio access technology.

In some embodiments, the user equipment 120 measures on pilot symbols transmitted from the second radio network node 140, when the second radio access technology is UTRA. The user equipment performs this measurement without connecting to the second radio network node 140, such as a NodeB. The transmit power of the second radio network node 140 is required to be known to the first radio network node 130, or the positioning node 110, or the user equipment 120, such that the first radio network node 130, or the positioning node 110, or the user equipment 120, may determine the path loss related information, such as a path loss value.
Action 2030, 2040

The user equipment 120 sends the path loss related information, thereby providing path loss related information to the location service.

In some embodiments of the method, the user equipment 120 sends and the first radio network node 130 receives the path loss related information. Expressed differently, the path loss related information is sent by the user equipment 120 to the first radio network node 130.

In some embodiments of the method, the user equipment 120 sends and the positioning node 110 receives the path loss related information. Expressed differently, the path loss related information is sent by the user equipment 120 to the positioning node 110.

As an example, the user equipment 120 sends information about uplink transmit power of the user equipment 120 to the first radio network node 130 or the positioning node 110. Thereby, the first radio network node 130 may determine the path loss as the difference between the transmit power of the user equipment 120 and the received power, which may be measured by the first radio network node 130. In other examples, the positioning node may receive a value indicating the received power, measured by the first radio network node 130, and the transmit power of the user equipment 120. Then, the positioning node 110 may determine the path loss, or path loss value, as the difference between the transmit power of the user equipment 120 and the value indicating the received power at the first radio network node 130.

In some embodiments of the method, the sending of path loss related information is performed in user plane or in control plane, via LPP, LPPe, SUPL or other higher-layer protocol between user equipment and positioning node or via LPPa or similar between a radio node and positioning node.
Action 2050

In some embodiments of the method, the first radio network node 130 receives and the positioning node sends the request for the path loss related information.

As an example, when the path loss related information comprises information about uplink transmit power of the user equipment 120, the radio network node 130 may determine the path loss value by measuring power received from the user equipment 120. Thus, the path loss value relates to the uplink.
Action 2060

The first radio network node 130 may send and the second radio network node 140 may receive a request for the path loss related information. The request relates to requesting information for use by the location service. Expressed differently, the request for path loss related information is sent to a second radio network node 140 managing a second radio access technology. The first radio access technology is different from the second radio access technology. As an example, the second radio network node 140 may determine the path loss by measuring or by instructing the user equipment to measure received power. Next, the second radio network node 140 may send the path loss related information to the first radio network node 130 as in action 2070.

In some embodiments of the method, the first and second radio network nodes 130, 140 are co-located or comprised in a multi-standard radio or mixed mode network node. The multi-standard radio network node may operate at least two radio access technologies. For example, a first and a second frequency band, a UTRA and Evolved-UTRA radio interfaces, etc.
Action 2065

In some embodiments, the first radio network node 130 estimates, such as measures, the path loss related information. As an example, the first radio network node 130 may measure the power of signals, such as Sounding Reference Signals (SRS), received from the user equipment 120.

As a first example, the first radio network node 130 may determine the path loss value as the difference between measured power of signals and path loss related information, such as transmit power of the user equipment, received from the user equipment 120 in action 2030.

As a second example, the first radio network node 130 may send the measured power of signals to the positioning node 110, which in turn may determine the path loss related information, i.e. the path loss value.
Action 2070

In some embodiments of the method, the first radio network node 130 receives and the second radio network node 140 sends the path loss related information. Expressed differently, the path loss related information is received from the second radio network node 140.

By way of action 2060 and 2070, the first radio network node 130 may obtain path loss related information from the second radio network node 140, which may use the second radio access technology when determining the path loss related information and then use it for the first radio access technology.

Action 2080

In some embodiments of the method, the first radio network node 130 sends and the positioning node 110 receives the path loss related information.

In this manner, the first radio network node 130 may forward, or pass on, the path loss related information when the path loss information is received from the user equipment 120 or the second radio network node 140.

Also in this manner, the first radio network node 130 may send the path loss related information to the positioning node, when the path loss related information is determined, such as measured, by the first radio network node 130. See action 2065.

Action 2090

In some embodiments of the method, the first radio network node 130 or the positioning node 110 determines a position of the user equipment 120 based on the path loss related information.

More generally, in some embodiments of the method, the first radio network node 130 or the positioning node 110 uses the path loss related information for positioning. Hence, the expression "using for positioning" includes the expression "determining a position of the user equipment based on the path loss related information".

In some embodiments of the method, the use of the path loss related information includes storing of the path loss related information in a database. The database may be used by the location services. As an example, the database may aid in determining a position of a user equipment.

Action 2100

In some embodiments of the method, the first radio network node 130 or the positioning node 110 selects a cell area description which has been generated based on the path loss related information. The cell area description is indicative of information relating to the position of the user equipment. As an example, the path loss related information may be received from the user equipment 120 and/or the first radio network node 130 when the positioning node selects the cell area description.

In some embodiments of the method, the selection of the cell area description further is based on one or more of the following items:
  Cell identification,
  Release information or model information of the user equipment 120,
  Information about UE capabilities of the user equipment 120,
  Transmit power of a base station serving a cell relating to the cell area description, and
  Cell selection offset configuration of the user equipment 120,
  Path loss information.

Action 2110

In some embodiments of the method, the handling of path loss related information comprises creating a database comprising cell area descriptions and path loss related information associated thereto. Each cell area description of the database is associated to a position and the request for path loss related information is related to at least one cell area description of the cell area descriptions. As an example in more detail, each cell area description is associated with at least one of:
  a set of positions with associated cell identifications, and radio measurements, comprised in the database.
The measurements may also comprise path loss related information gathered by the positioning node. In this manner, the cell area descriptions may be created based on the path loss related information gathered, or collected, by the positioning node.

The positioning node 110 may associate the path loss related information to said at least one cell area description, thereby creating the database of cell area descriptions and path loss related information associated thereto.

Figure 4:
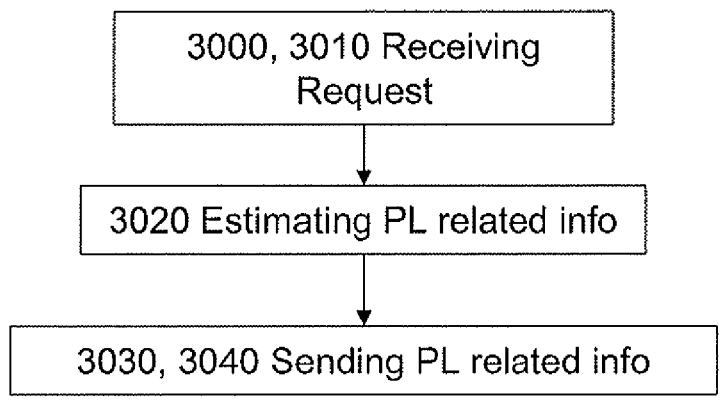
FIG. 4 shows a schematic flow chart of the exemplifying methods of FIG. 3 when seen from the user equipment.
Figure 6:
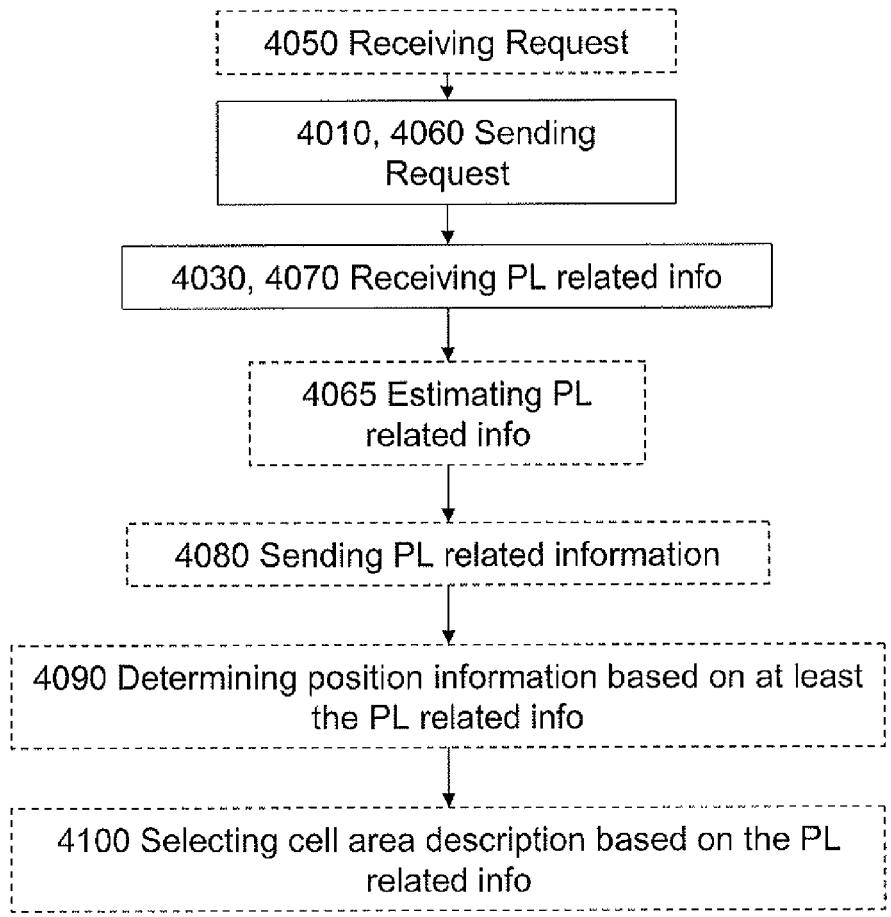
FIG. 6 shows a schematic flow chart of the exemplifying methods of FIG. 3 when seen from the first radio network node.
Figure 8:
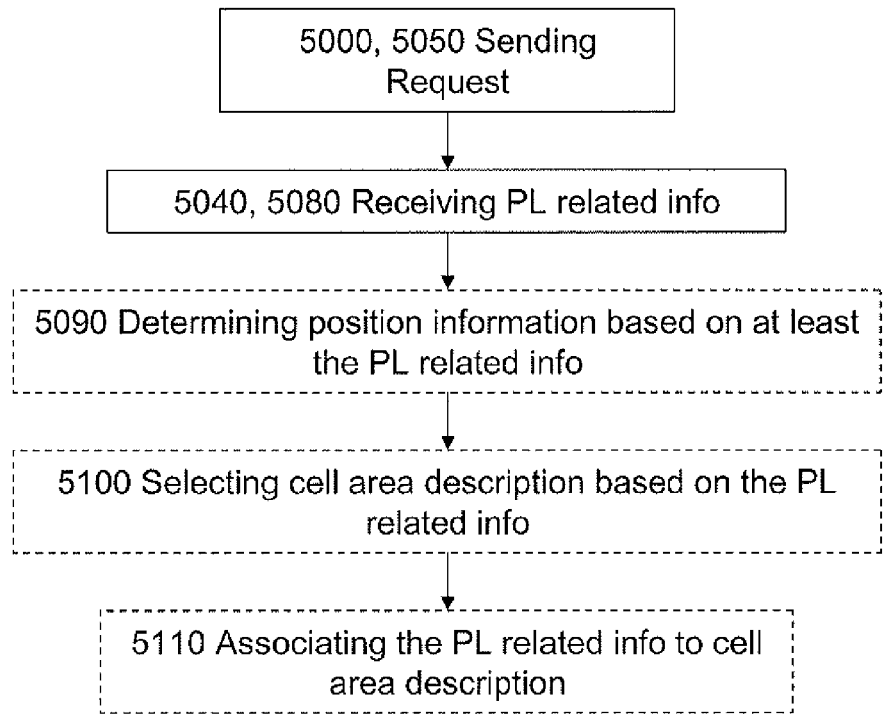
FIG. 8 shows a schematic flow chart of the exemplifying methods of FIG. 3 when seen from the positioning node.

The embodiments described with reference to FIG. 3 will now be described when seen from the user equipment 120, the first radio network node 130 and the positioning node 110, respectively. FIG. 4 shows a schematic flow chart of the exemplifying methods of FIG. 3 when seen from the user equipment 120. FIG. 6 shows a schematic flow chart of the exemplifying methods of FIG. 3 when seen from the first radio network node 130. FIG. 8 shows a schematic flow chart of the exemplifying methods of FIG. 3 when seen from the positioning node 110.

In FIG. 4, there is shown a schematic flow chart of the exemplifying methods of FIG. 3 when seen from the user equipment 120. It may be noted that according to some embodiments, the user equipment and the first radio network node are comprised in at least a Long Term Evolution system. This means that the user equipment and the first radio network node may be configured to handle at least two different radio access technologies. This example may be applied throughout the present disclosure.

The following actions may be performed. Notably, in some embodiments of the method the order of the actions may differ from what is indicated below.

Action 3000, 3010

This action corresponds to actions 2000, 2010.

The user equipment 120 receives a request for path loss related information. The request relates to requesting information for use by the location service.

In some embodiments of the method, the user equipment 120 receives and the positioning node 110 sends the request. Expressed differently, the request is received the user equipment 120 from a positioning node 110. See action 3000.

In some embodiments of the method, the user equipment 120 receives and the first radio network node 130 sends the request. Expressed differently, the request may be received by the user equipment 120 from the first radio network node 130. See action 3010.

Action 3020

This action corresponds to action 2020.

The user equipment 120 estimates, or determines, the path loss related information. As an example, the user equipment 120 includes information about uplink transmit power of the user equipment 120 into the path loss related information when determining the path loss related information.

In some embodiments of the method, the estimating comprises measuring the path loss related information.

In some embodiments of the method, when the path loss related information comprises the path loss value, the measuring of the path loss value is measured with respect to the first radio network node 130, such as the eNodeB. Thus, the path loss value relates to the downlink.

In some embodiments of the method, the measuring of the path loss value is measured with respect to the first radio network node 130 using at least a second radio access technology. These embodiments may, for example, be used when a plurality of radio access technologies are used by the first radio network node. The user equipment 120 is served by the first radio network node 130 using a first radio access technology that is different from said at least a second radio access technology. As an example the first radio access technology may be E-UTRA at a first frequency band and with transmission in TDD mode and the second radio access technology may be E-UTRA at the first frequency band and with transmission in FDD mode. As another example, the first radio access technology may be E-UTRA at a first frequency band and with transmission in TDD mode and the second radio access technology may be E-UTRA at the first frequency band and with transmission in FDD mode. In this manner, path loss related information may be obtained while using the first radio access technology while the path loss related information may be applied while using the second radio access technology.

In some embodiments, the user equipment 120 measures on pilot symbols transmitted from the second radio network node 140, when the second radio access technology is WCDMA. The user equipment performs this measurement without connecting to the second radio network node 140, such as a NodeB. The transmit power of the second radio network node 140 is required to be known to the first radio network node 130, or the positioning node 110, such that the first radio network node 130, or the positioning node 110, may determine the path loss related information, such as a path loss value.

Action 3030, 3040

This action corresponds to actions 2030, 2040.

The user equipment 120 sends the path loss related information, thereby providing path loss related information to the location service.

In some embodiments of the method, the user equipment 120 sends and the first radio network node 130 receives the path loss related information. Expressed differently, the path loss related information is sent by the user equipment 120 to the first radio network node 130. See action 3030.

In some embodiments of the method, the user equipment 120 sends and the positioning node 110 receives the path loss related information. Expressed differently, the path loss related information is sent by the user equipment 120 to the positioning node 110. See action 3040.

As an example, the user equipment 120 sends information about uplink transmit power of the user equipment 120 to the first radio network node 130 or the positioning node 110.

In some embodiments of the method, the sending of path loss related information is performed in user plane or in control plane.

Figure 5:
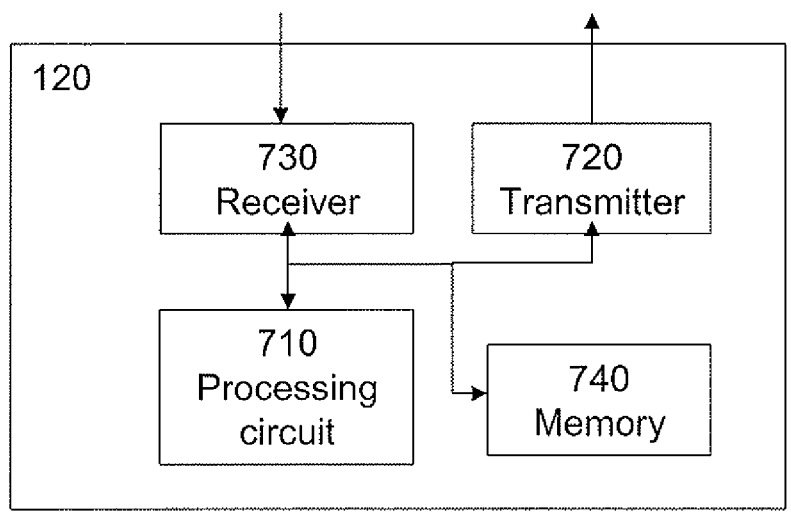
FIG. 5 shows a schematic block diagram of an exemplifying user equipment configured to perform the actions illustrated in FIG. 4.

Referring to FIG. 5, there is shown a schematic block diagram of the user equipment 120 configured to perform the actions illustrated with reference to FIG. 4. The user equipment 120 is configured for providing path loss related information to a location service. The user equipment 120 is configured to be served by a first radio network node 130. The user equipment 120 and the first radio network node 130 are configured for being comprised in a Long Term Evolution system 100.

The user equipment 120 comprises a receiver 730 configured to receive a request for path loss related information. The request relates to requesting information for use by the location service.

In some embodiments, the receiver 730 is configured to receive the request from the first radio network node 130 or the positioning node 110.

The user equipment 120 comprises a processing circuit 710 configured to estimate the path loss related information.

In some embodiments, the processing circuit 710 is configured to measure the path loss related information.

In some embodiments, when the path loss related information comprises the path loss value, the processing circuit 710 is configured to measure the path loss value is measured with respect to the first radio network node 130, such as the eNodeB.

In some embodiments, the processing circuit 710 is configured to measure the path loss value with respect to the first radio network node 130 using at least a second radio access technology. The user equipment 120 configured to be served by the first radio network node 130 using a first radio access technology that is different from said at least a second radio access technology.

In some embodiments, the processing circuit 710 is configured to measure on pilot symbols transmitted from the second radio network node 140, when the second radio access technology is UTRA.

The user equipment 120 comprises a transmitter 720 configure to send the path loss related information, thereby providing path loss related information to the location service.

In some embodiments, the transmitter 720 is configured to send the path loss related information to the first radio network node 130 or the positioning node 110.

In some embodiments, the user equipment 120 comprises a memory 740 for storing software to be executed by, for example, the processing circuit. The software may comprise instructions to enable the processing circuit to perform the method in the user equipment 120 as described above. The memory 740 may be a hard disk, a magnetic storage medium, a portable computer diskette or disc, flash memory, random access memory (RAM) or the like. Furthermore, the memory may be an internal register memory of a processor.

In FIG. 6, there is shown a schematic flow chart of the exemplifying methods of FIG. 3 when seen from the first radio network node 130.

The following actions may be performed. Notably, in some embodiments of the method the order of the actions may differ from what is indicated below.

Action 4010

This action corresponds to action 2010.

In some embodiments of the method, the user equipment 120 receives and the first radio network node 130 sends the request. Expressed differently, the request may be received by the user equipment 120 from the first radio network node 130. See action 2010.

Action 4030

This action corresponds to actions 2030, 2040.

In some embodiments of the method, the user equipment 120 sends and the first radio network node 130 receives the path loss related information. Expressed differently, the path loss related information is sent by the user equipment 120 to the first radio network node 130. See action 2030.

Action 4050

This action corresponds to action 2050.

In some embodiments of the method, the first radio network node 130 receives and the positioning node sends the request for the path loss related information.

As an example, when the path loss related information comprises information about uplink transmit power of the user equipment 120, the radio network node 130 may determine the path loss value by measuring power received from the user equipment 120. Thus, the path foss value relates to the uplink. See also action 4065.

Action 4060

This action corresponds to action 2060.

The first radio network node 130 may send and the second radio network node 140 may receive a request for the path loss related information. The request relates to requesting information for use by the location service. Expressed differently, the request for path loss related information is sent to a second radio network node 140 managing a second radio access technology. The first radio access technology is different from the second radio access technology.

In some embodiments of the method, the first and second radio network nodes 130, 140 are co-located.

Action 4065

This action corresponds to action 2065.

In some embodiments, the first radio network node 130 estimates, such as measures, the path loss related information. As an example, the first radio network node 130 may measure the power of signals, such as SRS, received from the user equipment 120.

Action 4070

This action corresponds to action 2070.

In some embodiments of the method, the first radio network node 130 receives and the second radio network node 140 sends the path loss related information. Expressed differently, the path loss related information is received from the second radio network node 140.

By way of action 4060 and 4070, the first radio network node 130 may obtain path loss related information from the second radio network node 140, which may use the second radio access technology when determining the path loss related information.

Action 4080

This action corresponds to action 2080.

In some embodiments of the method, the first radio network node 130 sends and the positioning node 110 receives the path loss related information.

In this manner, the first radio network node 130 may forward, or pass on, the path loss related information when the path loss information is received from the user equipment 120 or the second radio network node 140.

Also in this manner, the first radio network node 130 may send the path loss related information to the positioning node, when the path loss related information is determined, such as measured, by the first radio network node 130.

Action 4090

This action corresponds to action 2090.

In some embodiments of the method, the first radio network node 130 determines a position of the user equipment 120 based on the path loss related information.

Action 4100

This action corresponds to action 2100.

In some embodiments of the method, the first radio network node 130 selects a cell area description based on the path loss related information. The cell area description is indicative of information relating to the position of the user equipment.

In some embodiments of the method, the selection of the cell area description further is based on one or more of the following items:

Release information or model information of the user equipment 120,

Information about UE capabilities of the user equipment 120,

Transmit power of a base station serving a cell relating to the cell area description, and Cell selection offset configuration of the user equipment 120.

Figure 7:
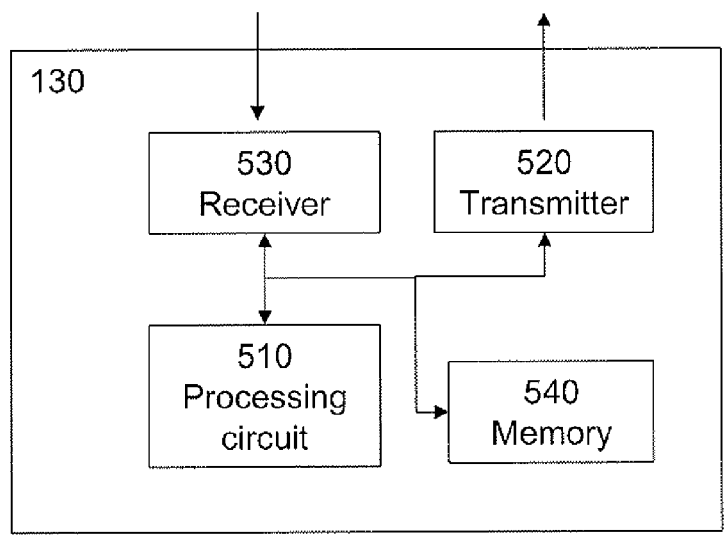
FIG. 7 shows a schematic block diagram of an exemplifying first radio network node configured to perform the actions illustrated in FIG. 6.

Referring to FIG. 7, there is shown a schematic block diagram of the first radio network node 130 configured to perform the actions illustrated with reference to FIG. 6. The first radio network node 130 is configured for handling path loss related information to be used by location service. The first radio network node 130 is configured for being comprised in a Long Term Evolution system (100).

The first radio network node 130 comprises a transmitter 520 configured to send a request for the path loss related information. The request relates to requesting information for use by the location service.

In some embodiments, the transmitter 520 is configured to send the request to the user equipment 120 or to the second radio network node 140.

in some embodiments, the transmitter 520 is configured to send the path loss related information to the positioning node 110. This may be the case when the first radio network node 130 is configured to forward the path loss related information from the user equipment 120 or the second radio network node 140.

The first radio network node 130 comprises a receiver 530 configured to receive the path loss related information.

In some embodiments, the receiver 530 is configured to receive the path loss related information from the user equipment 120 or from the second radio network node 140.

In some embodiments, the receiver 530 is configured to receive the request from the positioning node 110. This may be the case when the first radio network node 130 is configured to forward the request from the positioning node 110.

In some embodiments, the first radio network node 130 comprises a processing circuit 510 configured to measure power received from the user equipment 120.

In some embodiments, the processing circuit 510 is configured to determine a position of the user equipment 120 based on the path loss related information.

In some embodiments, the processing circuit 510 is configured to select a cell area description based on the path loss related information. The cell area description is indicative of information relating to the position of the user equipment.

In some embodiments, the selection of the cell area description further is based on one or more of the following items:

Release information or model information of the user equipment 120,

Information about UE capabilities of the user equipment 120,

Transmit power of a base station serving a cell relating to the cell area description, and Cell selection offset configuration of the user equipment 120.

In some embodiments, the first radio network node 130 comprises a memory 540 for storing software to be executed by, for example, the processing circuit. The software may comprise instructions to enable the processing circuit to perform the method in the first radio network node 130 as described above. The memory 540 may be a hard disk, a magnetic storage medium, a portable computer diskette or disc, flash memory, random access memory (RAM) or the like. Furthermore, the memory may be an internal register memory of a processor.

In FIG. 8, there is shown a schematic flow chart of the exemplifying methods of FIG. 3 when seen from the positioning node 110.

The following actions may be performed. Notably, in some embodiments of the method the order of the actions may differ from what is indicated below.

Action 5000

This action corresponds to actions 2000.

In some embodiments of the method, the user equipment 120 receives and the positioning node 110 sends the request. Expressed differently, the request is received by the user equipment 120 from a positioning node 110. See action 2000.

Action 5040

This action corresponds to actions 2040.

In some embodiments of the method, the user equipment 120 sends and the positioning node 110 receives the path loss related information. Expressed differently, the path loss related information is sent by the user equipment 120 to the positioning node 110.

Action 5050

This action corresponds to action 2050.

In some embodiments of the method, the first radio network node 130 receives and the positioning node sends the request for the path loss related information.

As an example, when the path loss related information comprises information about uplink transmit power of the user equipment 120, the positioning node 110 may determine the path loss value by receiving information about power received from the user equipment 120. The power received from the user equipment 120 may be measured by the first radio network node 130. Thus, the path loss value relates to the uplink.

Action 5080

This action corresponds to action 2080.

In some embodiments of the method, the first radio network node 130 sends and the positioning node 110 receives the path loss related information.

Action 5090

This action corresponds to action 2090.

In some embodiments of the method, the positioning node 110 determines a position of the user equipment 120 based on the path loss related information.

Action 5100

This action corresponds to action 2100.

In some embodiments of the method, the positioning node 110 selects a cell area description based on the path loss related information. The cell area description is indicative of information relating to the position of the user equipment.

In some embodiments of the method, the selection of the cell area description further is based on one or more of the following items:

Release information or model information of the user equipment 120,

Information about UE capabilities of the user equipment 120,

Transmit power of a base station serving a cell relating to the cell area description, and Cell selection offset configuration of the user equipment 120.

Action 5110

In some embodiments of the method, the handling of path loss related information comprises creating a database comprising cell area descriptions and path loss related information associated thereto. Each cell area description of the database is associated to a position and the request for path loss related information is related to at least one cell area description of the cell area descriptions. As an example in more detail, each cell area description is associated with at least one of:

a set of positions with associated cell identifications, and radio measurements, comprised in the database.

The measurements may also comprise path loss related information gathered by the positioning node. In this manner, the cell area descriptions may be created based on the path loss related information gathered, or collected, by the positioning node.

The positioning node 110 may associate the path loss related information to said at least one cell area description, thereby creating the database of cell area descriptions and path loss related information associated thereto.

In this manner, databases for positioning purposes may be improved. Thanks to that the database takes information about path loss into account, improved positioning results may be obtained for cases where transmit power of for example the first radio network node varies a lot.

In some embodiments of the method, the each of the cell area description are further associated to information about one or more of the following items:

Release information or model information of the user equipment 120,

Information about UE capabilities of the user equipment 120,

Transmit power of a base station serving a cell relating to the cell area description, and Cell selection offset configuration of the user equipment 120.

Hence, by combining the path loss related information with one or more of the above listed items, improved cell area descriptions may be generated. These cell area descriptions take into account path loss related information, whereby positioning by means of the cell area description becomes more accurate, especially for cases where transmit power or cell selection/reselection offset vary.

It may be said that the release information or model information of the user equipment may be provided by the UE or it may be obtained from another network node which maintains the information about the user equipment and/or user profile. Release information may be obtained via existing protocols (there are information elements that indicate the supported release). The release is typically is associated with a set of supported features and UE capabilities. E.g. Rel-9 UEs will not support any significant cell range expansion (or within a few dB only).

In some embodiments of the method, the database is used for at least one of:

positioning methods using cell IDs and relying on cell area descriptions,

Fingerprinting positioning, and

Adaptive enhanced cell ID (AECID) based positioning.

Figure 9:
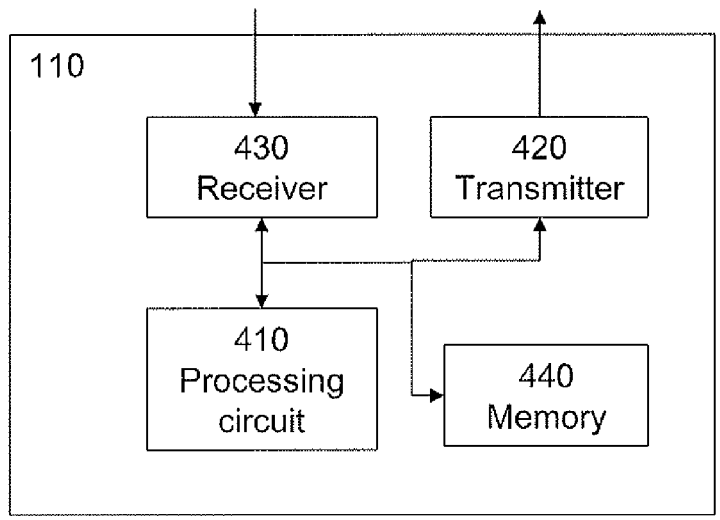
FIG. 9 shows a schematic block diagram of an exemplifying positioning node configured to perform the actions illustrated in FIG. 8.

Referring to FIG. 9, there is shown a schematic block diagram of the positioning node 110 configured to perform the actions illustrated with reference to FIG. 8. The positioning node 110 is configured for handling path loss related information to be used by location service. The positioning node 110 is configured for being comprised in a Long Term Evolution system (100).

The positioning node 110 comprises a transmitter 520 configured to send a request for the path loss related information. The request relates to requesting information for use by the location service.

In some embodiments, the transmitter 520 is configured to send the request to the user equipment 120 or to the first radio network node 130.

The positioning node 110 comprises a receiver, 530 configured to receive the path loss related information.

In some embodiments, the receiver 530 is configured to receive the path loss related information from the user equipment 120 or from the first radio network node 130.

In some embodiments, the positioning node 110 comprises a processing circuit 410 configured to determine a position of the user equipment 120 based on the path loss related information.

In some embodiments, the processing circuit 410 is configured to select a cell area description based on the path loss related information. The cell area description is indicative of information relating to the position of the user equipment.

In some embodiments, the selection of the cell area description further is based on one or more of the following items:
  Release information or model information of the user equipment 120,
  Information about UE capabilities of the user equipment 120,
  Transmit power of a base station serving a cell relating to the cell area description, and
  Cell selection offset configuration of the user equipment 120.

In some embodiments, the positioning node 110 is configured for handling of path loss related information in that the positioning node 110 is configured for creating a database comprising cell area descriptions and path loss related information associated thereto. Each cell area description of the database is associated to a position and the request for path loss related information is related to at least one cell area description of the cell area descriptions.

Thus, the processing circuit 410 may further be configured to associate the path loss related information to said at least one cell area description such as to create the database of cell area descriptions and path loss related information associated thereto.

In this manner, databases for positioning purposes may be improved. Thanks to that the database takes information about path loss into account, improved positioning results may be obtained for cases where transmit power of for example the first radio network node varies a lot.

In some embodiments, the each of the cell area description are further associated to information about one or more of the following items:
  Release information or model information of the user equipment 120,
  Information about UE capabilities of the user equipment 120,
  Transmit power of a base station serving a cell relating to the cell area description, and
  Cell selection offset configuration of the user equipment 120.

In some embodiments, the database is used for at least one of:
  positioning methods using cell IDs and relying on cell area descriptions,
  Fingerprinting positioning, and
  Adaptive enhanced cell ID (AECID) based positioning.

In some embodiments, the positioning node 110 comprises a memory 440 for storing software to be executed by, for example, the processing circuit. The software may comprise instructions to enable the processing circuit to perform the method in the positioning node 110 as described above. The memory 440 may be a hard disk, a magnetic storage medium, a portable computer diskette or disc, flash memory, random access memory (RAM) or the like. Furthermore, the memory may be an internal register memory of a processor.

It may be noted that path loss may refer to a path loss value or more generally to path loss related information, or path loss information. The path loss related information may be the path loss value or may provide information enabling a network node, such as a positioning node or other node, to determine a path loss value based on the provided information.

In the LTE standard, there is no path loss measurement defined and there are no requirements, e.g., accuracy or measurement period requirements, for it, for positioning or any other purpose in LTE. As a consequence, in LTE, it is not possible to report path loss as a positioning result, neither from the LCS target nor from the radio node. Requests for such measurements for the purpose of positioning are thus not possible either. With the current LTE standard, not only signaling of path loss is not possible but also the path loss calculation in the positioning node is not possible due to the lack of the necessary information, i.e. path loss related information.

Path Loss Related Information

At least the following ways of obtaining path loss information can be envisioned:
  collecting path loss related information in a network (note new signaling is necessary), which may be reported, e.g., when performing positioning, populating a database used for fingerprinting or AECID, configuring and collecting measurements for MDT and SON, or
  performing drive tests, or
  simulations.

Path Loss Estimation and Reporting in a Network

In the current standard, there are no means for reporting path loss estimates to the network or between any network elements, including UEs, radio network nodes and core network nodes. Furthermore, neither path loss nor the sufficient information that allows for deriving the path loss (further generally referred to as path loss related information) is provided to the LTE positioning node.

The path loss related information comprises at least one of:
  Path loss estimate, or path loss value, associated with one or more cells (e.g., performed by the UE or radio node such as eNodeB or a measurement unit e.g. such as LMU)—preferred solution;
  The information related to UE transmit power, or information about uplink transmit power of the user equipment, that can be used for estimating UL path loss, e.g.,
    Total UE transmit power and, if not known to the network, the resource allocation,
    UE PH and if not known, the maximum transmit power and the resource allocation (note that in the current standard PH can be reported from the UE to eNodeB via RRC),
    UE transmit power information for a specific signal, e.g., EPRE or the relative power difference compared to other transmissions, i.e. boosting, for sounding reference signals (SRS);
  UL received signal strength (e.g., for SRS or PUSCH);
  The information related to DL transmit power, or the value indicating power of reference signals, that can be used for estimating DL path loss, e.g.,
    Downlink transmit power (e.g., EPRE in average or for a specific signal such CRS, Positioning Reference Signal (PRS), or UE specific reference signals) or a radio node (e.g., eNodeB, macro/micro/pico base station, beacon device, relay, radio remote unit, etc.),
    DL RS TX power specified in [3GPP TS 36.214] (note that in the current standard only the serving cell DL RS TX can be signaled from eNodeB to the UE via RRC).

The path loss related information herein may be defined for the serving and non-serving cells and the associated nodes (one node may have more than one cell), for all activated carriers or per carrier.

As a minimum, to enable using path loss for positioning one of the following two options shall be possible:
  Delivering, or sending, the transmit power and the received signal power, both for either DL or UL, to the positioning node, or Delivering, or sending, the path loss estimate, or path loss value, either by the UE (DL path loss) or by the radio node (either UL or DL path loss), to the positioning node.

Furthermore, the obtained path loss estimates may be communicated from the positioning node to other nodes, as in one of the examples below.

Path loss related information may be transmitted as follows:
- reported by UEs to the network, e.g., positioning node or platform such as E-SMLC or SLP, e.g., via LPP or LPPe,
- reported by UEs to a radio node, e.g., eNodeB or measurement node such as LMU, except UE PH which can be reported by prior-art,
- reported by a radio node, e.g., eNodeB or radio measurement node such as LMU, to the positioning node, e.g., E-SMLC or SLP), e.g., via LPPa,
- exchanged between positioning nodes, e.g., E-SMLC and SLP,
- exchanged between radio nodes and/or radio measurement units, e.g., between any two, different or same type, of eNodeBs, LMUs, sensors, and relays,
- exchanged between UEs,
- exchanged between positioning node and database where the path loss information is stored,
- exchanged between elements of a distributed database where the path loss information is stored,
- exchanged between positioning node and other network node, e.g., O&M and SON, e.g.
  - the path loss with the corresponding position, e.g. from GPS, or may be transmitted from the positioning node to O&M or SON,
  - at least the transmit power of a radio node may be acquired or just passively received by the positioning node from O&M or SON,
  - between LTE or multi-RAT positioning node and nodes with positioning functionality in other RATs, e.g. RNC in WCDMA or BSC in GSM.
- exchanged between RATs of a multi-RAT or multi-standard radio (MSR) node, e.g., (1) measured in LTE or GSM, communicated to UMTS, and reported via UMTS or multi-RAT interfaces to positioning node, or (2) measured in GSM, communicated to LTE and reported to positioning node via LTE or multi-RAT interfaces.

According to the above, path loss related information may be reported or exchanged over at least one of the LTE interfaces, e.g., Uu, S1, X2, S5, S8, SGi, SLs, Lip, via at least one of the LTE protocols, e.g., LPP, LPPa, LPPe, RRC, or reported over an interlace used by multiple RATs including LTE. Other interfaces and protocols may also be envisioned.

In one embodiment, path loss related information, e.g., eNodeB transmit power in the serving cell or the UE transmit power, is added to an LPP message received from the UE before forwarding it to other network nodes, e.g., MME or serving gateway.

In one embodiment, reporting of the path loss related information and specifically path loss estimates may be configured for the purpose of positioning, MDT, SON, or interference coordination, e.g. enhanced ICIC in heterogeneous deployments, or interference cancellation in the radio network node.

It is now explained how path loss measurement(s) may be performed.

Although the LTE standard implies that at least the UE will do path loss estimation at least for determining UL power, there is, however, no path loss measurement defined, i.e. the standard does not support the path loss information exchange between network elements (nodes or devices). Also, only serving cell path loss estimation is possible with the current standard.

It is herein disclosed that path loss measurement is defined for one or more cells (i.e. including non-serving cells) and that the measured path loss may be signalled and used at least for the purpose of positioning.

In one embodiment, path loss measurement may be defined as a UE measurement capability. In another embodiment, path loss measurement may be defined as E-UTRA measurement abilities. Path loss measurements may be performed based on downlink or uplink signals. More specifically, in LTE these measurements may be performed on physical signals (e.g., synchronization signals) or reference signals (e.g., UE-specific reference signals, cell-specific reference signals (CRS), positioning reference signals (PRS), CSI reference signals—transmitted in downlink; demodulation reference signals or sounding reference signals (SRS)—transmitted in uplink).

In the current standard, path loss estimates may not be available when there are no UL transmissions, e.g., in the IDLE state or with long DRX. The path loss estimation, as disclosed herein, may be triggered, e.g., for positioning purposes, SON or MDT. For example, when path loss estimation is intended for positioning, path loss estimation may be triggered by a positioning measurement request (e.g. received from a positioning node or via cross-layer communication from an application running in the same UE where the application may be an LCS or location-based application). Furthermore, the measurement request or any message triggering the path loss measurements may also contain an indication for which cells path loss is to be measured. In one embodiment, the triggering message may be E-CID message indicating a list of measurements requested from the UE, where the requested list of measurements contains at least path loss measurement indication indicating that path loss is to be estimated. By default, the path loss may be estimated only for the serving cell.

To ensure quality of reported path loss estimates used for positioning and other functionalities, accuracy and reporting delay requirements may also need to be defined and tested. If path loss estimates are defined only for CRS, the requirements may be not necessary since the current standard specifies requirements for RSRP measurements.

It is an embodiment that the path loss measurement may be used for
- Positioning,
- Other non-positioning functionality (e.g., inter-cell interference coordination (ICIC), heterogeneous network operation, SON, Radio Resource Management (RRM), MDT, tracking area update (TAU), etc.).

Figure 10:
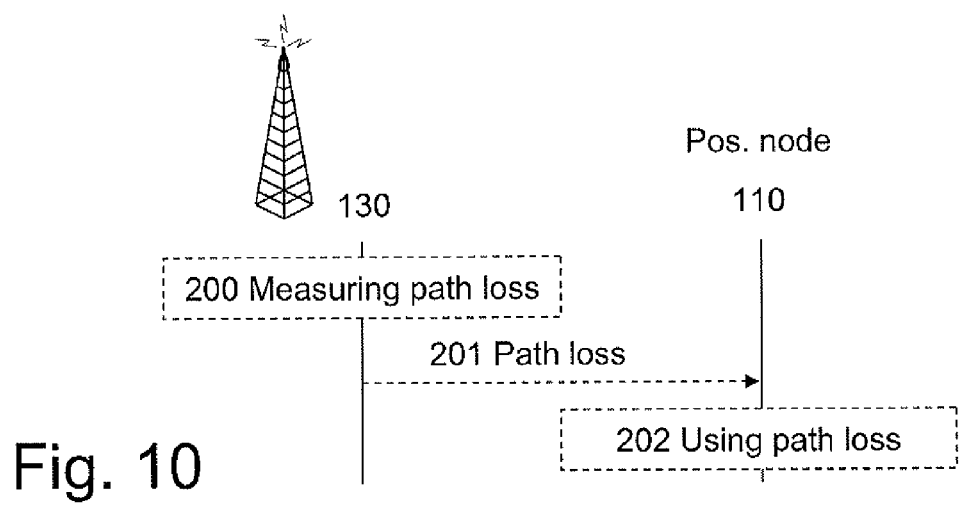
FIG. 10 shows a schematic, combined signalling and flow chart of an exemplifying method.

With reference to FIG. 10, an exemplifying method in a radio network node 130, such as an eNodeB, comprises:
- measuring 200 by eNodeB path loss in relation to a user equipment served by the radio network node 130;
- sending 201, or signalling, path loss to a positioning node 110.

In this manner, the LPPa may be extended with further functionality, i.e. functionality of signalling a path loss value and/or path loss related information. This example relates to path loss in the uplink.

The sending 201 may be any of:
- UL path loss measured by eNodeB (200 is used),
- DL path loss received from UE and further communicated by eNodeB to positioning node (200 is not used—instead the eNB may receive path loss related information from a user equipment which is not shown in FIG. 10, see other examples), path loss related information that enables estimation of either DL or UL path loss in the positioning node (200 is not used).

Also with reference to FIG. 10, an exemplifying method in a positioning node 110 comprises:
 receiving 201 path loss from a radio network node 130, such as an eNodeB; and
 using 202 the path loss for determining a position of a LCS target, such as a user equipment (not shown).
In this manner, the LPPa may be extended.

Figure 11:
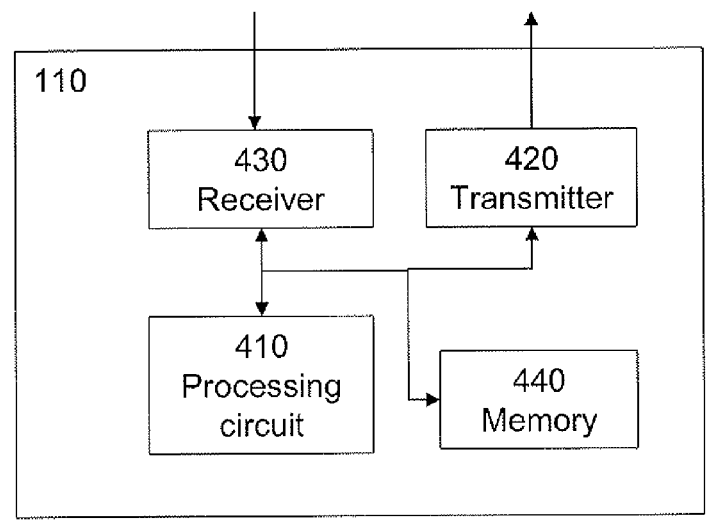
FIG. 11 shows a schematic block diagram of an exemplifying positioning node configured to perform the method performed by the positioning node in FIG. 10.

In FIG. 11, there is shown an exemplifying positioning node 110 configured to perform the method performed by the positioning node 110 in FIG. 10.

The positioning node 110 may comprise a processing circuit 410 configured to use the path loss.

The positioning node 110 may comprise a receiver 430 configured to receive the path loss.

The positioning node 110 may comprise a transmitter 420.
The positioning node 110 may comprise a memory 440.

Figure 12:
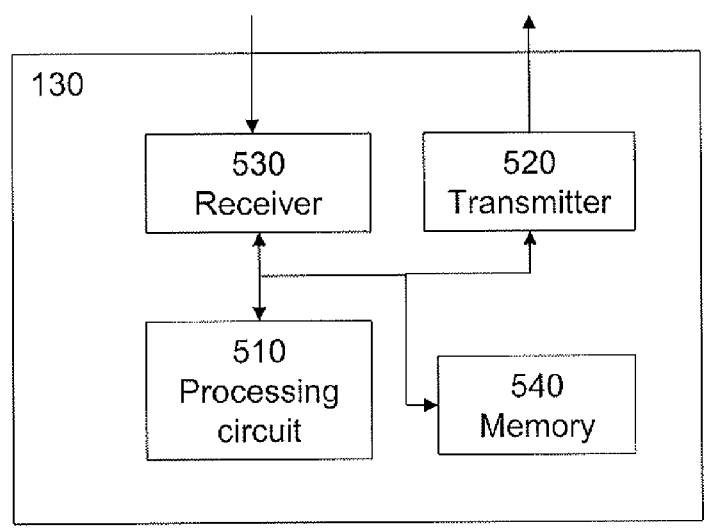
FIG. 12 shows a schematic block diagram of an exemplifying radio network node configured to perform the method performed by the radio network node in FIG. 10.

In FIG. 12, there is shown an exemplifying radio network node 130 configured to perform the method performed by the radio network node 130 in FIG. 10.

The radio network node 130 may comprise a processing circuit 510 configured to measure the path loss.

The radio network node 130 may comprise a transmitter 520 configured to send the path loss.

The radio network node 130 may comprise a receiver 530.
The radio network node 130 may comprise a memory 540.

Figure 13:
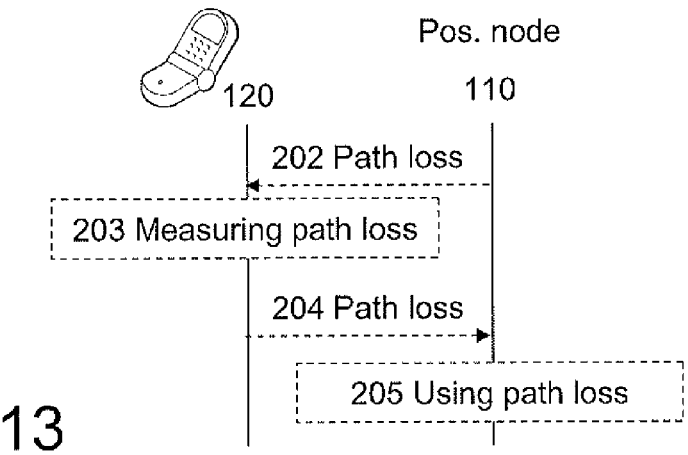
FIG. 13 shows a schematic, combined signalling and flow chart of an exemplifying method.

With reference to FIG. 13, an exemplifying method in a user equipment 120 comprises:
 measuring 203 path loss;
 sending 204, or signalling, path loss to a positioning node 110.
In this manner, the LPP, LPPe or SUPL may be extended with further functionality, i.e. functionality of signalling path loss. This example relates to path loss in the downlink.

Figure 14:
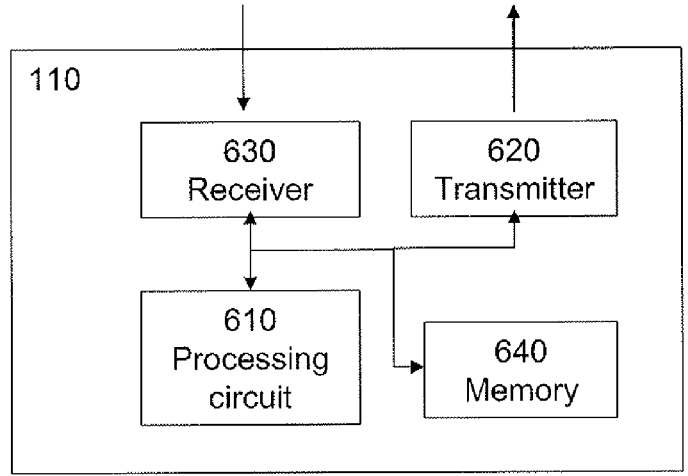
FIG. 14 shows a schematic block diagram of an exemplifying positioning node configured to perform the method performed by the positioning node in FIG. 13.

Also with reference to FIG. 13, an exemplifying method in a positioning node 110 comprises:
 receiving 204 path loss from a user equipment 120; and
 using 205 the path loss for determining a position of a LCS target, such as the user equipment 120.
In this manner, the LPP, LPPe or SUPL may be extended.
The path loss may be for any one or a combination of:
 serving cell
 reference cell
 one or more neighbor cells In FIG. 14, there is shown an exemplifying positioning node 110 configured to perform the method performed by the positioning node 110 in FIG. 13.

The positioning node 110 may comprise a receiver 630 configured to receive the path loss.

The positioning node 110 may comprise a processing circuit 610 configured to use the path loss.

The positioning node 110 may comprise a transmitter 620.
The positioning node 110 may comprise a memory 640.

Figure 15:
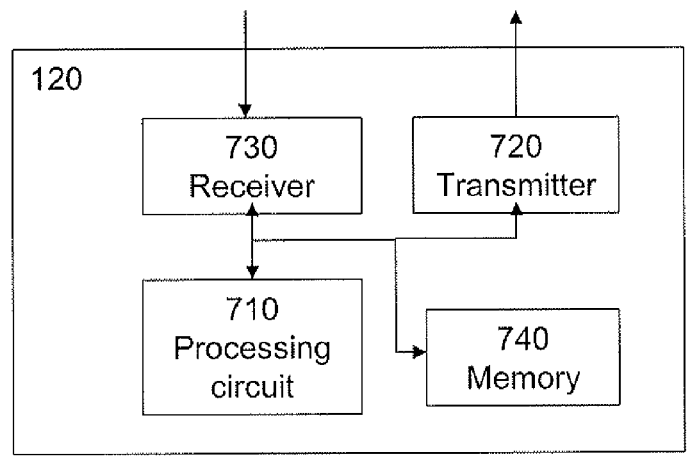
FIG. 15 shows a schematic block diagram of an exemplifying user equipment configured to perform the method performed by the user equipment in FIG. 13.

In FIG. 15, there is shown an exemplifying user equipment 120 configured to perform the method performed by the user equipment 120 in FIG. 13.

The user equipment 120 may comprise a processing circuit 710 configured to measure the path loss.

The user equipment 120 may comprise a transmitter 720 configured to send the path loss.

The user equipment 120 may comprise a receiver 730.
The user equipment 120 may comprise a memory 740.

The following relates to database creation.

Due to varying transmit power, e.g. for energy saving or interference coordination reasons, cell ID based positioning based on the collected cell ID report statistics becomes unreliable since different serving cell IDs may be reported at the same location by different UEs, depending on the relative transmit power difference among neighbour cells. This problem is solved by the cell area description disclosed herein.

Figure 16:
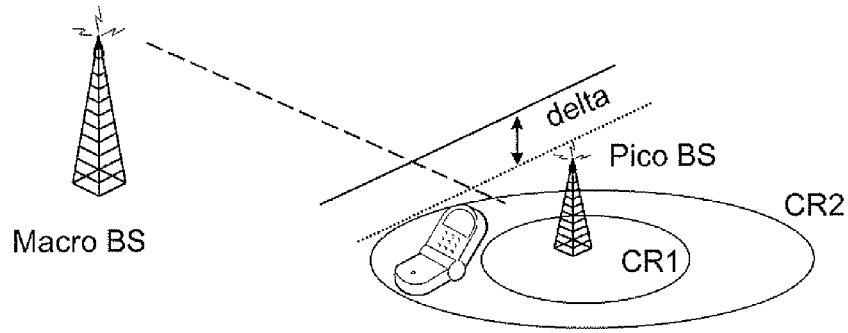
FIG. 16 shows cell range expansion in heterogeneous networks.

Now returning to cell range control techniques, in particular cell range control by the cell selection offset at the receiver, which will be explained in the following. Cell selection/reselection based on the received signal strength is typical in cellular networks. However, it has been observed that using an offset (also referred to as biased cell selection or cell range expansion), where an offset may be both a positive and a negative value, may be efficiently used to control the coverage of different cells, which can be useful in network deployments with radio nodes having different transmit power levels, e.g. to overcome a significant transmit power imbalance in downlink between macro radio base stations (BSs) and pico radio BSs which may be larger than 20 dB. The example is illustrated in FIG. 16, where RSRP stands for Reference Signal Received Power and delta may be denoted $\Delta$.

The offset is typically provided by the network and is used to indicate an offset to be applied when evaluating candidates for cell re-selection or when evaluating triggering conditions for measurement reporting. In LTE, the current standard defines the offset range of [−24 dB, 24 dB], which may be cell- or frequency-specific. The corresponding cell-specific range in WCDMA is [−10 dB, 10 dB], which is significantly smaller than for LTE.

UEs with interference cancellation capabilities and cell range expansion support, may see a significantly larger coverage of some cells than UEs without such support and thus report a different Cell ID in the cell range expansion area, i.e. cell ID based positioning becomes unreliable if UEs are not differentiated, e.g., by their capability for support enhanced interference coordination mechanisms and/interference cancellation.

Example 1

For a hexagonal cellular network layout, an offset of 10 dB may imply approximately two times larger maximum cell range and four times larger cell area. With 20 dB offset, the cell range change is four times, and the corresponding cell area change is 16 times. The variation is likely to be even larger in some networks. One can also note that the range of [−10 dB, 10 dB] spans 20 dB, e.g. at certain times the same cell may use −10 dB and at other times it may use 10 dB offset. The range span for LTE is 48 dB, which means a significant cell range variation, which gives a lot of flexibility to the network, but requires special handling for positioning which relies on cell area descriptors.

Example 2

This problem becomes particularly severe with LTE since large offsets have not been supported in earlier systems by the UE requirements and UE capabilities, which made it possible using statically described cell areas in prior art solutions. In LTE, UEs with advanced receiver capabilities are now being discussed to specifically enable large cell range expansion by means of cell reselection offsets. These capabilities, however, are unlikely to become mandatory which will result in that different cell service areas may be seen by different devices, e.g. depending on the device capability. In heterogeneous deployments, UEs with no interference cancellation capability may be able to deal with the biased cell selection using an offset below 6 dB, although large offsets are likely to be supported by at least some devices in LTE for capacity enhancement (an offset of up to 24 dB is supported with LTE signalling).

Figure 17:
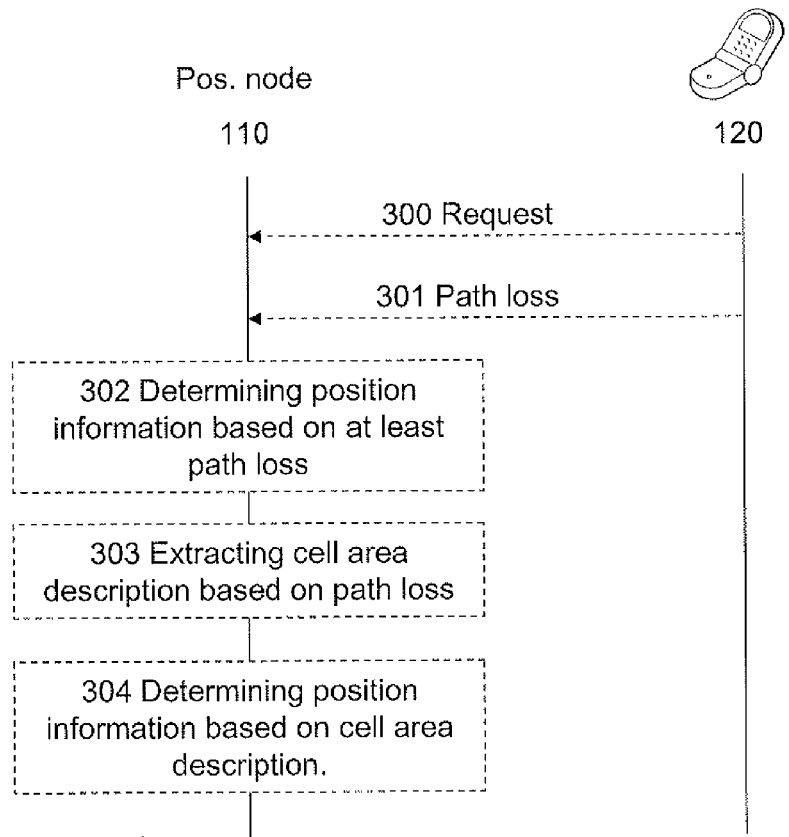
FIG. 17 shows a schematic, combined signalling and flow chart of an exemplifying method.

Now turning to FIG. 17, there is shown a further exemplifying method in a positioning node 110. The method may comprise:

(optional) receiving 300 a request for positioning determination; As an example, the request may be from a LCS Client, a user equipment 120, eNodeb 130, or the like.

(optional) sending a measurement request or a message triggering path loss measurements to the user equipment or eNodeB from positioning node, where the measurement request may indicate for which set of cells the path loss is to be measured or the path loss related information provided, receiving 301 a path loss value or information enabling the positioning node to determine the path loss value, i.e. receiving path loss information; For example, the path loss information may be received from a eNodeB or a user equipment.

determining 302 position information based at least on the path loss value. More generally, the position information is determined based on path loss information.

In some examples, the method may comprise:

extracting 303 a cell area description based on at least one of: cell identification and the path loss value; and determining 304 the position information of the LCS target based on the cell area description.

The position information may be a set of coordinates for a position, an area indicating a position or may comprise information about an intersection indicating a position. The intersection may be defined by a first and a second line, where a line shall be understood in a general sense and thus may also be a curve, a first line and a first area, or even a first volume and a first area and a second area, etc.

The cell area description, extracted in action 303, may comprise information as described in section "cell area description" such as to handle a plurality of different scenarios.

Figure 18:
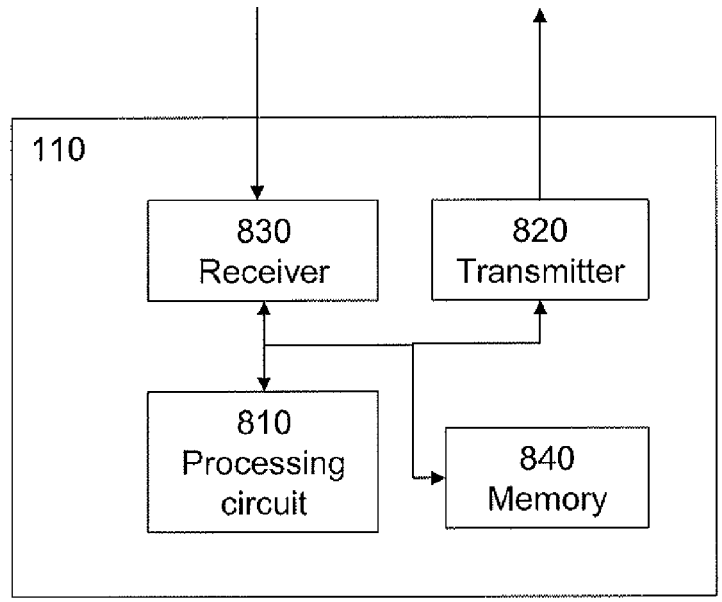
FIG. 18 shows a schematic block diagram of an exemplifying positioning node configured to perform the method performed by the positioning node in FIG. 17.

In FIG. 18, there is shown an exemplifying positioning node 110 configured to perform the method performed by the positioning node 110 in FIG. 17.

The positioning node 110 may comprise a receiver 830 configured to receive a request for position determination and path loss.

The positioning node 110 may comprise a processing circuit 810 configured to determine position information based on at least the path loss information.

The positioning node 110 may comprise a transmitter 820.

The positioning node 110 may comprise a memory 840.

Figure 19:
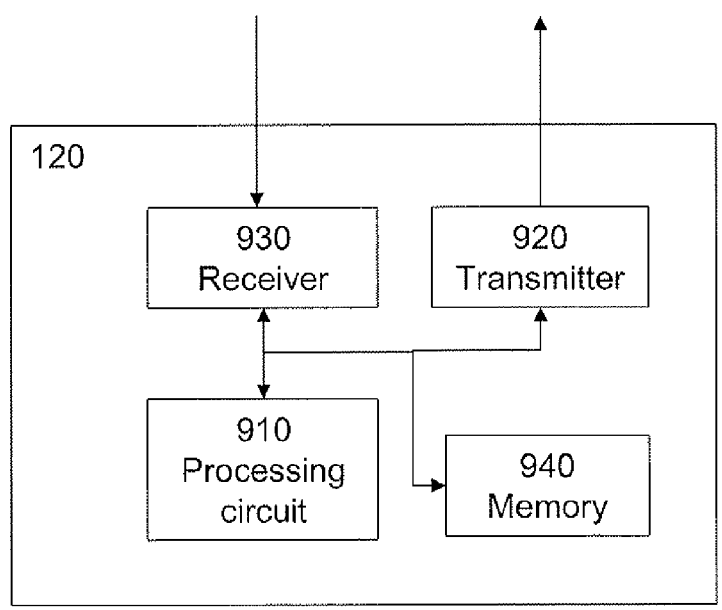
FIG. 19 shows a schematic block diagram of an exemplifying user equipment configured to perform the method performed by the user equipment in FIG. 17.

In FIG. 19, there is shown an exemplifying user equipment 120 configured to perform the method performed by the user equipment 120 in FIG. 17.

The user equipment 120 may comprise a transmitter 920 configured to send the path loss.

The user equipment 120 may comprise a processing circuit 910 configured to measure the path loss.

The user equipment 120 may comprise a receiver 930.

The user equipment 120 may comprise a memory 940.

Moreover, the fact that measurement databases (e.g., for fingerprinting and AECID) are built over the time, when the transmit power of radio nodes vary, the received signal strength measurements have ambiguous relation to the distance between the transmitting node and the receiving node or device.

Figure 20:
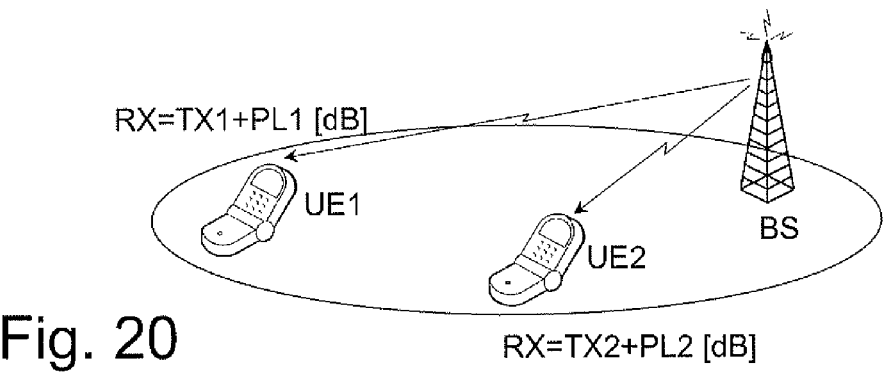
FIG. 20 shows a schematic overview of two user equipments located in a cell of a radio base station.

With reference to FIG. 20, there is illustrated that the received signal strength measurements may have an ambiguous relation to the distance. In FIG. 20, it is shown how, depending on the transmit power level, the same received signal strength may be seen by different UEs that are far and close to the BS, e.g., 15 dB transmit power difference results in the same received power at any locations with 15 dB path loss difference which may correspond to more than two times difference in distance (e.g., 50 m and 100 m or 2 km and 4 km).

This results in corrupt databases and may result in large positioning errors when such databases are used for positioning. Restoring databases is very time consuming and costly. Positioning performance degradation is also expected during the time when the databases are populated with new data. Therefore, it is here disclosed methods and network nodes for building of an improved database for use in positioning methods, such as the one mentioned in this paragraph. Moreover, it is here disclosed methods and network nodes for using the improved database to improve positioning methods.

The following relates to creation of database. Details about the cell area description are presented in the following. Further, methods of creating cell area descriptors are described, e.g., for Cell area descriptors based on path loss thresholds,
Cell area descriptors accounting for cell area overlap.

In one embodiment, based on the collected path loss information, the cell area descriptors may be created on-line and then stored in another database for further use, e.g., for CID, E-CID, AECID or hybrid positioning.

Cell Area Description Based on a Path Loss Threshold (Database Creation and Structure Thereof)

Methods of creating cell area descriptors based on path loss thresholds are described.

A cell area may be described by a boundary that corresponds to a certain path loss level or defined by a certain path loss threshold, independently on the cell overlap. In an example, the cell area is represented by a polygon created with given uncertainty covering a cluster of points. The cell area may be continuous, as in FIG. 21, or discontinuous, e.g. having at least one outer and one inner boundary, as in FIG. 22.

Figure 21:
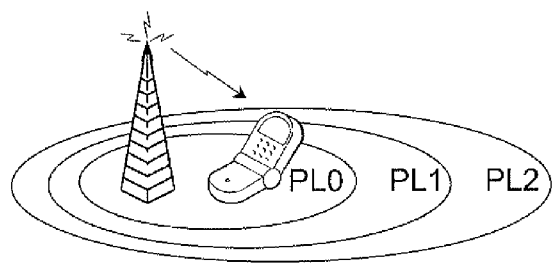
FIG. 21 shows a schematic sketch of a cell in which multiple path loss levels are defined.

In FIG. 21, there is shown multiple path loss levels PL0, PL1, PL2 for a cell, continuous cell area given by the outer boundary of PL2 cluster.

Figure 22:
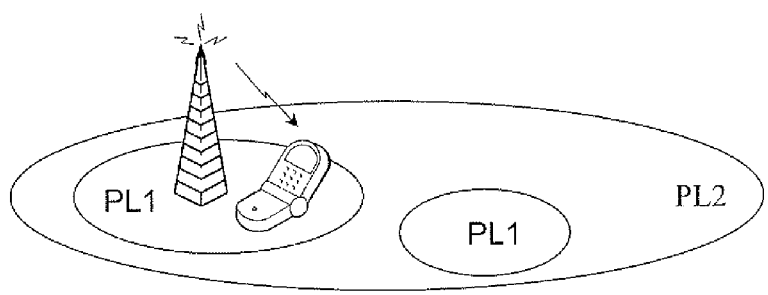
FIG. 22 shows another schematic sketch of a cell in which multiple path loss levels are defined.

In FIG. 22, there is shown multiple path loss levels for a cell with discontinuous cell area corresponding to the path loss level PL1 and comprising union of the two non-contiguous areas.

Here it is explained how cell area description may be configured such as to account for cell overlap Methods of creating cell area descriptors, which may be stored in for example a database to be for positioning purposes, accounting for cell overlap are described.

The disadvantage of not accounting for the cell overlap is particularly significant in networks where the cell areas are typically non-uniform and highly irregular. When the cell ID of the serving cell is known, it is desirable that the cell ID positioning result comprises the serving area of the cell rather than the coverage area of a cell for a given path loss level. The service area of two neighbouring cells may depend, e.g., on a relative transmit power of the cells and/or cell selection/reselection parameters.

Assume the received signal strength is given by RX=TX−PL, where RX is the received signals strength, TX is the transmit power, and PL is the path loss. The boundary between two cells, cell A and cell B, defining the relation between the signal strength of the two cells at the boundary may be described, e.g., by equation $$(TX_A - PL_A) + \Delta_{AB} = (TX_B - PL_B),$$

where $\Delta_{AB}$ is a given cell selection offset, $PL_A$ and $PL_A$ are the path loss levels with respect to cell A and B, respectively, $TX_A$ and $TX_B$ are the transmit power levels of cell A and cell B, respectively, Note that either the absolute transmit power levels or the difference $(TX_A-TX_B)$ may be given. A point is within the service area of cell A when $$(TX_A-TX_B)+\Delta_{AB}>PL_A-PL_B.$$

Generalized to the case with multiple path loss levels in two overlapping cells A and B, the service area of cell A may be derived as described below. Let $S_{PL_A^i}$ and $S_{PL_B^j}$ denote the clusters corresponding to the i-th path loss level of cell A and j-th path loss level of cell B, respectively. The total service area of cell A may be given by $$\bigcup_i \left( S_{PL_A^i} \setminus \bigcup_{j:(TX_A-TX_B)+\Delta_{AB}<PL_A^i-PL_B^j} S_{PL_B^j} \right),$$

i.e. the union of cluster subtraction results, where the subtraction operation for clusters has been described, e.g. in U.S. provisional application 61/431,693, filed on 2011 Jan. 11, "Methods for generating, managing and reporting overlapping location and restricted area regions for fingerprinting positioning", and a subtraction result is the area of cell A of the cluster corresponding to a path loss level without the part served by cell B (i.e. there is a path loss cluster of B overlapping with the path loss cluster of A such that at least some part of the overlap belongs to the serving area of B). The two-cell case is illustrated in FIG. 23.

Figure 23:
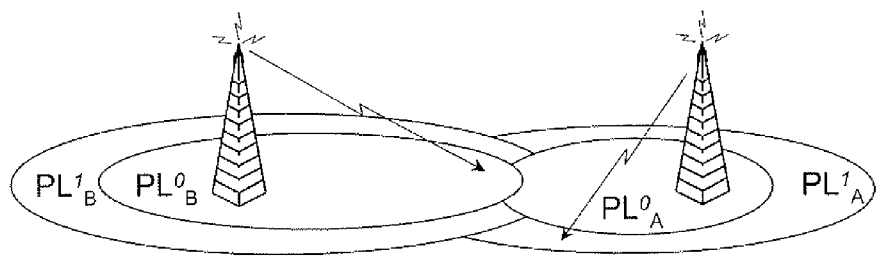
FIG. 23 shows an exemplifying definition of a service area of a cell.

In FIG. 23, it is shown how the service area of cell A in an example with two cells with multiple path loss levels, $PL_A^1>PL_B^1>PL_A^0>PL_B^0$ may be defined. The visible parts of the two dotted areas compose the service area of Cell A.

The procedure of defining the cell area while accounting for the cell overlap may also be generalized further to multiple cells. The generalization to a multi-cell case is as follows, $$\bigcup_i \left( S_{PL_A^i} \setminus \bigcup_{\substack{B,j:B \in Neighbours(A),\\ j:(TX_A-TX_B)+\Delta_{AB}<PL_A^i-PL_B^j}} S_{PL_B^j} \right),$$

where the set of cell NEIGHBOURS(A) contains neighbours overlapping with cell A.

Conditional cell area descriptors are described in the following (generating and using conditions for cell area descriptions, where the cell area descriptions may be derived from and stored in the database).

In the description, it has been mentioned that the cell area may be different for different UEs and/or at different times when the transmit power of radio nodes may vary. More examples are provided on selecting a cell area description depending on a condition and cell neighbor information. Cell area clusters are thus created depending on a condition and based on the path loss information. The neighbor cells may be obtained from the neighbor cell relation information, e.g., from O&M.

Selecting cell area descriptors depending on the cell selection/reselection parameters, such as cell selection offset.

The condition for selecting a cell area description is related to cell selection/reselection parameters. In one specific example, the values of cell selection/reselection offset may be associated with the radio node type, e.g. small or no offset for macro cells and large offset for lower-power nodes such as micro, pico, home eNodeB or relay nodes.

Here it is disclosed at least the following parts:

1. At least two descriptions are defined for a cell, e.g., corresponding to a smaller and a larger area; the descriptions may be
   defined statically (e.g., with an external cell planning tool or by a functionality in a network node) and selected dynamically based on some criteria, or additional information (further referred to as a condition) or may be created semi-statically or dynamically for a given condition;

In a specific example, one set of cell area descriptions for a given set of neighbor cells (one description per cell) is defined for cell selection based on the received signal strength (i.e., zero dB offset), and another set of cell area descriptions for the same set of cells is defined for cell selection based on non-zero offset for at least some cells (e.g. for lower power nodes or pico cells, where the cell selection/reselection strategy may mimic the path loss-based cell selection, e.g. offset=transmit power difference of a macro neighbor cell with the pico cell for which the offset is defined). The example is schematically illustrated in FIG. 24.

Figure 24:
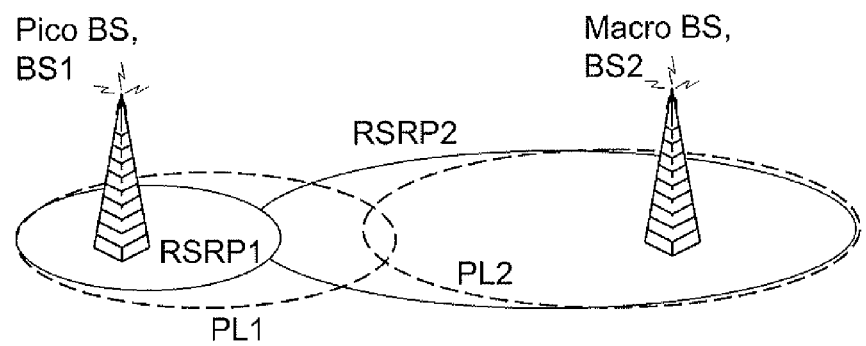
FIG. 24 shows cell areas with path loss-based cell selection.

In FIG. 24, there is shown a radio network node BS1, which is a lower power node, e.g. a pico BS, and another radio network node BS2, which is higher power node, e.g. a macro BS. The dashed lines denote the cell areas with the path loss-based cell selection strategy, whilst the solid lines denote the RSRP-based cell selection. The illustrated cell coverage area shapes are schematic.

2. UEs are distinguished by the applied cell selection/reselection parameters
   Where the parameters may include, e.g., the offset for the serving cell or the difference between the serving cell offset and a neighbor (e.g., the strongest neighbor) cell offset.
   In one embodiment, the UEs are categorized based on their capability to support different ranges of the offset, e.g. the UEs that support only small offsets (e.g. up to 6-8 dB) and the UEs that support larger offsets (e.g. 10 dB and higher). In this example, the legacy UEs (e.g. LIE Rel-8 or LTE Rel-9 UEs) may by default be associated with the category of UEs that support only small offsets, whilst larger cell areas may by default be associated with later release UEs.

3. Different cell area descriptions, e.g. for a given cell ID, are provided depending on the condition, where the condition may be at least one of
   UE release/model,
   UE capability (which results in UE-specific or UE group specific cell areas),
   cell selection/reselection configuration (which may be cell- or UE-specific and may vary in time).

In one embodiment, the condition is used as a tag to allow for generating different area descriptions depending on the condition, i.e. conditional cell clusters. To create such conditional cell clusters, the condition needs to be known to the positioning node and the corresponding information needs to be available for UE- and cell-specific conditions to differentiate among cell descriptions based on the condition. To enable this, the following signaling may be needed:
   The information related to the UE capability to support certain cell selection/reselection (e.g. UE release, UE category or the UE capability defined by the maximum supported offset where the UE capability may also be related to the UE interference cancellation capability or enhanced operation of heterogeneous networks). The information may be received by the positioning node from
- the UE, e.g. via LPP protocol or its extension such as LPPe, or
- the serving radio node of the UE, e.g. via LPPa protocol in LTE, which may require UE-specific signaling, and also from the UE to the radio node, if the information is not available in the radio node, or
- the network controlling node associated with the UE, e.g. MME in LTE or RNC in WCDMA.

The information may be provided either upon a request from the positioning node or in an unsolicited way, i.e. without a request.

The information about the cell selection/reselection parameters configured for cells, e.g. cell-specific offsets, where the information may be received by the positioning node from
- a radio node, also referred to as radio network node, e.g. eNodeB in LTE,
- a network node, e.g. SON or O&M.

The information may be provided either upon a request from the positioning node or in an unsolicited way, i.e. without a request, e.g. periodically or upon a configuration change in the network.

Now continuing with a description of cell area descriptors for cells with variable transmit power.

Here, the condition for selecting a cell area description is related to transmit power. The cell area clusters are created based on path loss and the transmit power information of neighbor cells.

In one embodiment, records containing cell ID information in a database are tagged with the transmit power information. If the transmit power of the serving cell and neighbor cells have not changed, then the cell ID information may be used directly for creating the cell area cluster. Otherwise, if there is some change in relative transmit power difference for neighbor cells, the cell boundary may shift which has to be accounted for when creating the cell area cluster.

The transmit power of a radio node may be signaled to the positioning node, e.g.,
- from the radio node via LPPa or from O&M, or
- from the UE (which performs measurements) via LPP or LPPe.

At least the following applies:
- At least two descriptions are defined for a cell, e.g., corresponding to a smaller and a larger area, depending on the transmit power difference for neighbor cells;
- Different cell area descriptions are provided depending on the condition, where the condition is related to the absolute transmit power levels or transmit power difference for neighbor cells;

The clusters are created based on path loss information.

It is now explained how to managing path loss related information for creating a database.

It is assumed that path loss has been obtained, e.g., by any of the methods described herein.

The obtained path loss may be used to facilitate CID, E-CID, AECID, hybrid or any other positioning method.

In LTE, cell ID positioning methods either exploit
- pre-defined description for each cell, or
- a database with collected information (e.g., reported by UEs or the serving eNodeBs) comprising serving cell IDs stamped with a precise location that form a cell cluster.

As it has been explained earlier, none of the two approaches above is reliable when the transmit power of cells varies over time and/or different cell reselection parameters apply for different UEs.

Therefore, the clusters and cell area descriptors are constructed based on path loss information.

The path loss information may be stored in a database. Records comprising, in addition to coordinates, at least path loss and the associated cell ID information are stored in a database, e.g., as <(x,y,z), CELL_ID, PL>. The records may also be time-stamped, e.g., <(x,y,z), CELL_ID, PL, t>. Furthermore, frequency or frequency band information may also be added, e.g., <(x,y,z), CELL_ID, PL, f> or <(x,y,z), CELL_ID, PL, t, f>, which may be utilized to enable path loss compensation, e.g., when comparing path loss measured at different frequencies or frequency bands.

For each measurement point, one or more records at a time may be created, e.g., depending on whether the serving cell only or neighbor cell information is available.

The database may be maintained by and/or used for positioning functionality only or may be shared by multiple features and functionalities, e.g. including control-plane positioning, user-plane positioning, tracking area update, SON, MDT (Minimizing Drive Tests) or any network management functionality. The database may be internal or external to network nodes.

A way of managing the path loss related information is to organize the information in clusters, which will be referred to as path loss clustering herein.

Figure 26:
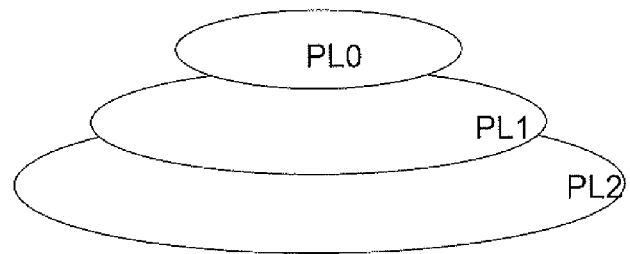
FIG. 26 shows inclusive (overlapping) clusters for the same cell that are organized hierarchically.

Clustering is an approach of grouping the information (e.g. measurements or metrics) that meet a certain criteria, e.g. one cluster may contain information structures that have a parameter having a certain value or a value falling into a certain range. In positioning, clustering may be used for describing areas with the same or similar properties, e.g. areas with the same or similar characteristic (e.g. path loss, received signal strength or environment type) or areas describing one or more cells. Clusters may also be organized hierarchically by any principle but such that a higher-level cluster has characteristics common for lower-layer clusters under its hierarchy, e.g. as illustrated in FIG. 26 where a cluster with path loss values not exceeding PL2 may be viewed as a higher-layer cluster, and a cluster with path loss values not exceeding PL1 may be a lower-layer cluster. Furthermore, the cluster corresponding to PL2 may be a lower-layer cluster with respect to the cell ID tag when they are all described by path loss for a certain cell.

In one embodiment, quantized path loss levels are stored to facilitate cluster build up. Multiple path loss levels, e.g., PL0, PL1, PL2, . . . , and thus corresponding multiple clusters may exist. The levels may be defined, e.g., by cells or depending on cells size (e.g., a finer path loss level grid for smaller cells or cells in urban environment where cells are typically small) or the set of path loss levels may be the same for a large area or the entire network. Linear or logarithmic scale may be used to obtain path loss levels, and the number of levels and the step size depend, e.g., on the data availability, data processing efficiency and periodicity, and whether the data have to be exchanged among servers or the elements of a distributed database.

A cluster may comprise, e.g., a set of path loss measurements and/or points for which the path loss is within a given range and/or a geometrically describing geographical area, e.g., by means of one or more of position reporting formats. For example, a cluster corresponding to a path loss level PL0 may comprise a set of points/records <(x,y,z), CELL_ID, PLj>, where the cluster may be constructed e.g. according to one of the following options:

Option 1: PL1>PLj≥PL0 (i.e. complementary cluster which does not overlap with clusters corresponding to other path loss levels), or Option 2: quantized PLj equals PL0, i.e. complementary quantized path loss cluster, see FIG. 25, or Option 3: PL0≥PLj (i.e. inclusive cluster, which may be hierarchically organized, see FIG. 26).

Figure 25:
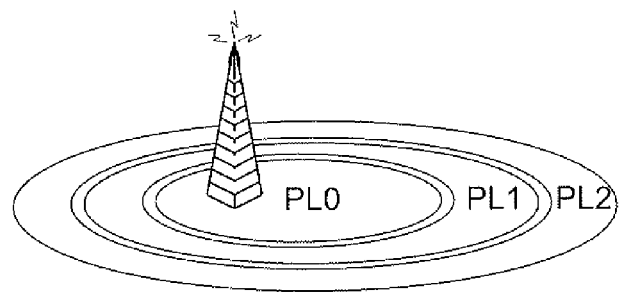
FIG. 25 shows complementary (non-overlapping) clusters for the same cell with quantized path loss levels.

In FIG. 25, there is shown complementary (non-overlapping) clusters for the same cell with quantized path loss levels.

In FIG. 26, there is shown inclusive (overlapping) clusters for the same cell that are organized hierarchically.

Another exemplifying method in a positioning node comprises one or more of the following actions:

The positioning node receives information related path loss, or a path loss value. For example, by use of LPP and/or LPPa.

The positioning node organizes the information related to path loss, or the path loss value, in groups. Each group comprises path loss value in a specific interval; and The positioning node uses path loss for positioning purposes.

Furthermore, it may be difficult, or even impossible, to have multi-RAT positioning relying on non-timing measurements where LTE involved since it is not possible to create clusters for multi-RAT positioning based on measurements from multiple RATs since the transmit power is likely to be different in different RATs.

In some embodiments, path loss related information is signalled between cell of different frequency and/or utilizing different radio access technologies. This signalling may be referred to as inter-frequency and/or inter-RAT signaling of path loss related information In addition to intra-frequency path loss related information, inter-frequency, inter-band or inter-RAT path loss related information may also be defined. As an example, in an LTE network path loss related information for GSM, CDMA or UMTS may also be enabled and the other way around—in UMTS or GSM the path loss related information for LTE or CDMA may be enabled. By this, inter-frequency and inter-RAT signaling of path loss information from the LTE network to other cellular networks becomes possible. The path loss related information obtained on the other frequency or RAT may also be tagged, when signaled by one of the methods described above, with the frequency and/or RAT information. In another embodiment, path loss compensation may apply prior signaling.

When inter-frequency or inter-RAT path loss is not available, the inter-frequency and inter-RAT path loss may be estimated based on the inter-frequency and inter-RAT received signal strength measurements and the path loss related information necessary for estimating the path loss for the corresponding frequency, if different from the current one.

Figure 27:
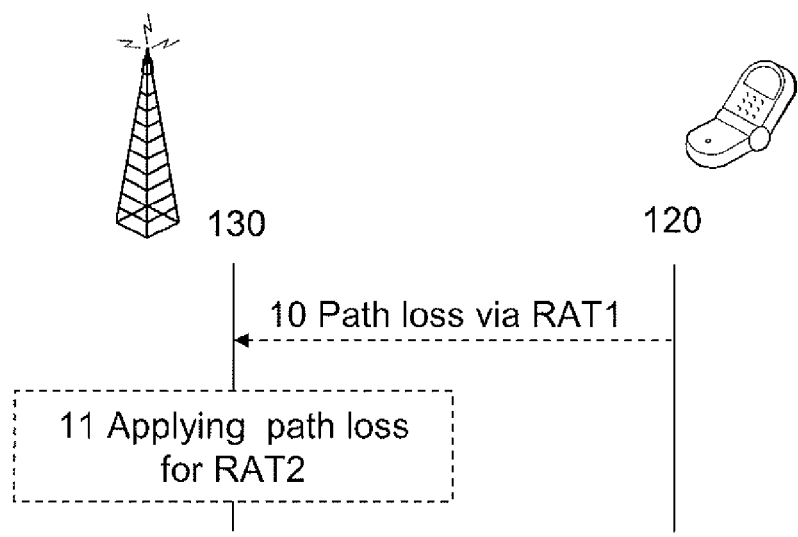
FIG. 27 is a combined signalling and flow chart of a first radio network node and a user equipment.

In FIG. 27, there is shown an exemplary method in a radio network node 130, wherein the radio network node 130 utilizes at least a first and a second radio access technology, comprises:

applying 11 path loss information, obtained from the first radio access technology, to a user equipment served via the second radio access technology.

A dashed arrow 10 indicated that the path loss information may be signaled by the user equipment 120. In this manner, the first radio network node 130 may receive the path loss information from the user equipment 120.

Figure 28:
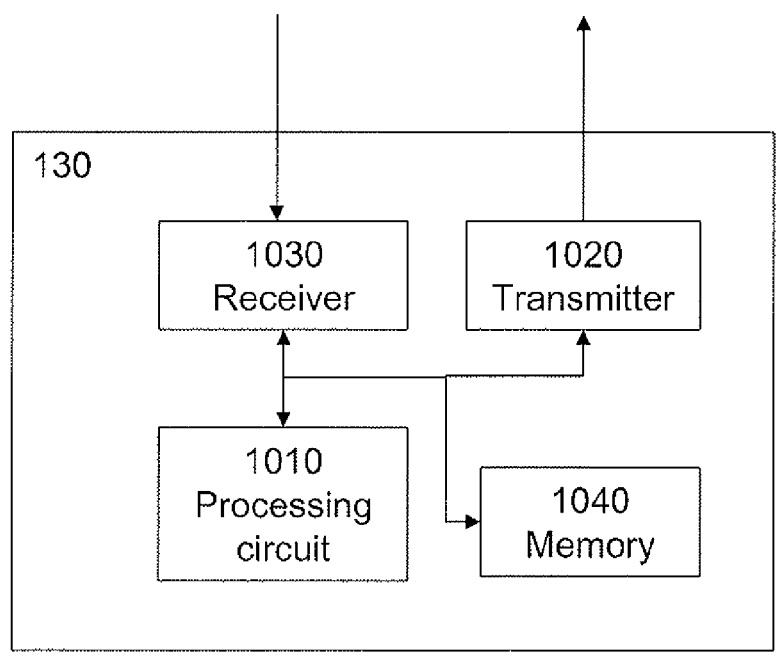
FIG. 28 is a schematic block diagram of an exemplifying first radio network node configured to perform the method performed by the first radio network node in FIG. 27.

In FIG. 28, there is shown a radio network node 130 configured to perform the method performed by the radio network node in FIG. 27.

The radio network node 130 may comprise a receiver 1030 configured to receive, from a user equipment, path loss measured by the user equipment while using, or via, a first radio access technology (RAT) RAT1.

The radio network node 130 may comprise a processing circuit 1010 configured to apply the path loss information to a user equipment 120 served via a second RAT RAT2.

The radio network node 130 may comprise a transmitter 1020.

The radio network node 130 may comprise a memory 1040.

Now mentioning some positioning methods and returned position results in conjunction with which some of the embodiments presented herein may be utilized.

To meet demands from location based services (LBS), the LTE network will deploy a range of complementing methods characterized by different performance in different environments. Depending on where the measurements are conducted and where the final position is calculated, the methods can be UE-based, UE-assisted or network-based, each with own advantages. The following methods are available in the LTE standard for both the control plane and the user plane:

Cell ID (CID) positioning

UE-assisted and network-based E-CID, including network-based angle of arrival (AoA)

UE-based and UE-assisted A-GNSS (including A-GPS)

UE-assisted Observed Time Difference of Arrival (OTDOA).

Hybrid positioning, fingerprinting positioning and AECID do not require additional standardization and are therefore also possible with LTE. Furthermore, there may also be UE-based versions of the methods above, e.g. UE-based GNSS (e.g. GPS) or UE-based OTDOA. There may also be some alternative positioning methods such as civic-address based positioning, see regular patent application U.S. Ser. No. 12/871,984, "Positioning and location services using civic addresses information", filed on 2010 Aug. 31, by M. Anderson, I. Siomina, T. Wigren, or proximity based location. UTDOA may also be standardized in a later LTE release, since it is currently under discussion in Third Generation Partnership Project (3GPP).

Cell ID Positioning

All cellular systems are divided into cells, each cell served by one specific base station. Each base station may serve more than one cell. The important point from a positioning and navigation perspective is that the cell where a specific UE is located is known in the cellular system. Hence, after determination of the geographical area covered by a specific cell, it can be stated that the UE is located somewhere within said geographical area, as long as it is connected and the reported cell identity of the serving cell is equal to the cell identity of the particular geographical area. In several systems, the preferred representation of the geographical area of the cell is given by the cell polygon format, see 3GPP TS 23.032, "Universal Geographical Area Description (GAD)".

The cell area described by a polygon is an approximation, and the polygon is normally pre-determined in the cell-planning tool to represent the cell area with a certain confidence. The confidence is the probability that the terminal is actually located within the reported region, in this case bounded by the cell polygon. Although the accuracy of the method is limited by the cell range, its main advantages are a very low response time as well as the fact that it has no impact on the UE, it is easy to implement, it is widely spread and always available where there is cellular coverage. To exploit these advantages and enhance the CID technique, the accuracy of CID is further improved in E-CID method.

CID positioning, being a fast and low-complexity method, is also often used to obtain an approximate location which may be used as an initial location to facilitate more accurate positioning methods, e.g. A-GNSS or OTDOA.

Enhanced Cell Identity (Cell ID) Positioning

Enhanced CID (E-CID) methods exploit four sources of position information: the CID and the corresponding geographical description of the serving cell, the Timing Advance (TA) of the serving cell, the CDs and the corresponding signal measurements of the cells (up to 32 cells in LTE, including the serving cell), as well as AoA measurements. The following techniques are commonly used for E-CID:

- CID+TA (combining of the geographical cell description, the eNodeB position, and the distance between the eNodeB and the UE obtained from a time measurement, where the timing measurement is e.g. Round Trip Time (RTT) positioning in the WCDMA or TA in LTE)
- Signal strength (distance measures are derived from signal strengths measured in the UE and combined with cell polygons as for CID and TA)
- AoA (e.g., defining the angle of a UE with respect to a reference direction which is the geographical North).

TDOA-/TOA-Based Methods (e.g. OTDOA, UTDOA or GNSS/A-GNSS)

OTDOA is a method based on time difference measurements conducted on DL positioning reference signals received from multiple locations, where the user location is further calculated by multi-lateration. UTDOA, an UL version of OTDOA, is a method that exploits UL time of arrival or time difference of arrival measurements performed at multiple receiving points. The UTDOA measurements are to be based on SRS. A-GNSS/GNSS is a group of methods using satellite signal measurements, where the US GPS and the European Galileo are some examples of GNSS systems.

RF Fingerprinting

The method exploits received signal strength measurements of the UE together with the corresponding cell identities to map onto a geographical map of the radio properties. The maps may be obtained by extensive site surveying or radio signal strength simulation software.

AECID

The AECID method enhances fingerprinting positioning performance by extending the number of radio properties that are used, where at least cell IDs, TA and AoA may be used in addition to received signal strengths, and where the corresponding databases are automatically built up by collecting high precision OTDOA and A-GNSS positions, tagged with measured radio properties. The AECID positioning method was first disclosed in WO2007/043915 (publ. 2007 Apr. 19), T. Wigren, Adaptive enhanced cell identity positioning.

The main steps of the AECID algorithm are
1. Tagging of high-precision position results (e.g. A-GPS measurements) with at least one of
   a. Cell Ids of detected cells.
   b. Auxiliary connection information (e.g. radio access bearer, time)
   c. Quantized auxiliary measurements (e.g. TA and signal strength)
2. Collection of all high precision measurements with the same tag in high precision measurement clusters.
3. Calculation of a (tagged) polygon, which contains a pre-specified fraction of said clustered high precision position measurements in the interior, thereby providing a polygon with known confidence value. Note: The confidence is the probability that the UE is actually located in the reported region.
4. Storage of said tagged polygons in a database of polygons.
5. When an AECID positioning is to be performed, the following steps are performed:
   a. Determination of at least one of
      i. Cell IDs of detected cells.
      ii. Auxiliary connection information (e.g. radio access bearer, time)
      iii. Quantized auxiliary measurements (e.g. TA or signal strength)
   b. Formation of the tag, defined by step a.
   c. Retrieval of the polygon, corresponding to said tag.
   d. Reporting of said polygon.

Polygon Format

The polygon format, see 3GPP TS 23.032, "Universal Geographical Area Description (GAD)", is described by a list of 3-15 latitude, longitude corners, encoded in WGS 84 co-ordinates. Currently, uncertainty information for polygon format is included implicitly. No confidence can be reported with polygon. However, the polygon is typically pre-determined in the cell planning and described the cell area with a certain confidence, where the confidence is the probability that the terminal is actually located within the reported region, in this case bounded by the cell polygon.

Operations on Polygons

The following operations have been defined for operating polygons, e.g., for AECID: polygon fusion/merging, see WO2008/043390 (publ. 2008 Apr. 17), T. Wigren, Polygon fusion in fingerprinting positioning, International patent application, and polygon splitting, see WO2008/054272 (publ. 2008 May 8), Extended clustering.

Splitting algorithms are defined for splitting of a cluster of high precision position measurement into multiple smaller clusters and creating multiple polygons per tag with the said multiple polygons per tag taken together covering a smaller area than would a single polygon, corresponding to the original cluster. Can be useful e.g. in position estimation from multiple results (e.g. from multiple positioning methods) or when reporting of multiple shapes is possible. Example: geographically distinct regions, hilly terrain, separate coverage regions of a cell in front of and behind an antenna.

Fusion (merging) of at least two sub-polygons for (1) merging geographically non-overlapping polygons of sub-clusters, to one polygon, representing all or a subset of said sub-clusters, and for (2) merging overlapping polygons of sub-clusters, to one polygon, representing all or a sub-set of said sub-clusters.

Position Reporting Formats

Typical Formats

Seven position reporting formats, each associated with a Geographical Area Description (GAD) shape, are supported in 3GPP for LTE, Universal Mobile Telecommunications System (UMTS) and GSM. All formats can be used for positioning, although some formats may be more typical for some methods. The seven currently supported formats are: Polygon, Ellipsoid arc, Ellipsoid point, Ellipsoid point with uncertainty circle, Ellipsoid point with uncertainty ellipse, Ellipsoid point with altitude, Ellipsoid point with altitude and uncertainty ellipsoid. Next, typical formats for different positioning methods are given.

CID:

The cell boundary is modeled by the set of non-intersecting polygon segments connecting all the corners.

E-CID:

The positioning result of CID+TA is typically an ellipsoid arc describing the intersection between a polygon and circle corresponding to RTT. A typical result format of the signal-strength based E-CID positioning is a polygon since the signal strength is subject e.g. to fading effects and therefore often does not scale exactly with the distance. A typical result of AoA+TA positioning is an ellipsoid arc which is an intersection of a sector limited by AoA measurements and a circle from the RTT-like measurements.

RF Fingerprinting:

A typical result format is a polygon. Some vendors do use the point with uncertainty format which then result in a low confidence.

AECID:

A typical result format is a polygon (see also the section describing AECID).

TDOA-/TOA-based methods (e.g. OTDOA, UTDOA or GNSS/A-GNSS):

A typical format of a positioning result for these methods is an ellipsoid point with uncertainty circle/ellipse/ellipsoid which is the result of intersection of multiple hyperbolas/hyperbolic arcs (e.g. OTDOA) or circles/arcs (e.g. UTDOA, GNSS, or A-GNSS).

Hybrid Positioning:

Since the hybrid technique involves a mix of any of the methods above, the position result can be any shape, but in many cases it is likely to be a polygon or point with an uncertainty measure.

Civic Address Based Positioning:

if the civic address is converted, see PCT/SE2011/050417, to one of the standardized formats for GAD shapes, the converted format is most likely to be polygon.

Shape Conversion

Even though some formats may be more specific for some methods, shape conversion may be used to transform a positioning result from one format (shape) to another one, see international patent application WO2008/127159, publicly available 2008 Oct. 23, A. Kangas and T. Wigren. Conversion of civic addresses to a GAD shape has been disclosed in, as mentioned above, PCT/SE2011/050417.

Although the present description is mainly given for UE, it should be understood by the skilled in the art that "UE" is a non-limiting term which means any wireless device or node (e.g. PDA, laptop, mobile, sensor, relay, or even a small base station that are being positioned, i.e. a LCS target in general). Hence, as used herein, a user equipment may a mobile phone, a cellular phone, a Personal Digital Assistant (PDA) equipped with radio communication capabilities, a smart phone, a laptop equipped with an internal or external mobile broadband modem, a portable electronic radio communication device or the like.

Generally, a processing circuit herein may be a processing unit, a processor, an application specific integrated circuit (ASIC), a field-programmable gate array (FPGA) or the like. As an example, a processor, an ASIC, an FPGA or the like may comprise one or more processor kernels.

Generally, a memory herein may be for storing software to be executed by, for example, the processing circuit. The software may comprise instructions to enable the processing circuit to perform a method disclosed herein. The memory may be a hard disk, a magnetic storage medium, a portable computer diskette or disc, Flash memory, random access memory (RAM) or the like. Furthermore, the memory may be an internal register memory of a processor.

The signalling described herein is either via direct links or logical links (e.g. via higher layer protocols and/or via one or more network nodes). For example, in LTE in the case of signalling between E-SMLC and PSAP the positioning result is transferred via multiple nodes (at least MME and GMLC).

The positioning node described in embodiments herein is a node with positioning functionality. For example, for LTE it may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC.

Although at least some of the embodiments are described for eNodeBs also referred to as RBSs or radio nodes in the description, it is understood by the skilled in the art that it applies to a general radio node (examples of which can be general radio base stations, macro/pico/micro/femto/home radio base station, eNodeBs, relay nodes, beacon devices, radio measurement units for general or specific purpose, e.g. LMUs (Location Measurement Unit) for positioning which may communicate with eNodeBs over a standardized or a proprietary interface). A cell is an area associated with a radio node, where the radio node may have one or more cells associated with it.

Although the disclosed embodiments are described mainly for LTE, at least some of the described embodiments can also be used with other radio access technologies, single- and multi-RAT systems. The example of RATs can be HSPA, CDMA, LTE FDD, LTE TDD, WiMAX, UMTS TDD, GSM, and their evolutions.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a user equipment for providing path loss related information to a location service, wherein the user equipment is served by a first radio network node using a first radio access technology, wherein the user equipment and the first radio network node are comprised in a Long Term Evolution system, the method comprising:
   receiving a request for path loss related information, wherein the request relates to requesting information for use by the location service;
   estimating a path loss value, wherein said estimating comprises measuring the path loss value with respect to the first radio network node using at least a second radio access technology that is different from the first radio access technology; and
   sending the path loss value, in response to the received request, thereby providing the path loss value to the location service.

2. The method of claim 1, wherein the request is received from the first radio network node and the path loss value is sent to the first radio network node.

3. The method of claim 1, wherein the request is received from a positioning node and the path loss value is sent to the positioning node.

4. The method of claim 3, wherein the path loss value relates to at least one of: a serving cell, a primary cell, one or more neighbor cells, one or more secondary cells, one or more carrier frequencies, and one or more radio access technologies.

5. The method of claim 1, wherein the sending of path loss value is performed in user plane or in control plane.

6. A user equipment for providing path loss related information to a location service, wherein the user equipment is configured to be served by a first radio network node using a first radio access technology, wherein the user equipment and the first radio network node are configured for being comprised in a Long Term Evolution system, the user equipment comprising:
- a receiver configured to receive a request for path loss related information, wherein the request relates to requesting information for use by the location service,
- a processing circuit configured to estimate a path loss value by measuring the path loss value with respect to the first radio network node using at least a second radio access technology that is different from the first radio access technology, and
- a transmitter configured to send the value, in response to the received request, thereby providing the path loss value to the location service.

7. A method in a first radio network node for handling path loss related information to be used by a location service, wherein the first radio network node is comprised in a Long Term Evolution system and is serving a user equipment using a first radio access technology, the method comprising:
- sending a request for the path loss related information, wherein the request relates to requesting information for use by the location service;
- receiving the path loss related information; and
- determining a position of the user equipment based on the path loss related information;

wherein the request for path loss related information is sent to a second radio network node managing a second radio access technology, wherein the first radio access technology is different from the second radio access technology, and the path loss related information is received from the second radio network node.

8. The method of claim 7, wherein the request for path loss related information is sent to a user equipment and the path loss related information is received from the user equipment.

9. The method of claim 7, wherein the path loss related information comprises one or more of:
- a path loss value;
- a value indicating power of reference signals, the reference signals being transmitted by the first radio network node and being received by the user equipment; and
- information about uplink transmit power of the user equipment.

10. The method of claim 7, wherein the method further comprises selecting a cell area description based on the path loss related information, wherein the cell area description is indicative of information relating to the position of the user equipment.

11. The method of claim 10, wherein the selection of the cell area description further is based on one or more of:
- release information or model information of the user equipment;
- information about UE capabilities of the user equipment;
- transmit power of a base station serving a cell relating to the cell area description; and
- cell selection offset configuration of the user equipment.

12. The method of claim 7, wherein the first and second radio network nodes are co-located or comprised in a multi-standard radio network node.

13. A first radio network node for handling path loss related information to be used by a location service, wherein the first radio network node is configured for being comprised in a Long Term Evolution system and to serve a user equipment using a first radio access technology, the first radio network node comprising:
- a transmitter configured to send a request for the path loss related information to a second radio network node managing a second radio access technology, wherein the first radio access technology is different from the second radio access technology, and wherein the request relates to requesting information for use by the location service;
- a receiver configured to receive the path loss related information from the second radio network; and
- a processing circuit configured to determine the position of the user equipment based on the path loss related information.

14. A method in a positioning node for handling path loss related information to be used by a location service, wherein the positioning node is comprised in a Long Term Evolution, LTE, system, the method comprising:
- sending a request for the path loss related information to a first radio network node comprised in the LTE system and serving a user equipment using a first radio access technology, wherein the request relates to requesting information for use by the location service;
- receiving the path loss related information from the first radio network node, wherein the path loss value is measured with respect to the first radio network node using at least a second radio access technology that is different from the first radio access technology; and
- selecting a cell area description based on the path loss related information, wherein the cell area description is indicative of information relating to the position of the user equipment.

15. The method of claim 14, wherein the path loss related information comprises one or more of:
- a path loss value;
- a value indicating power of reference signals, the reference signals being transmitted by the first radio network node and being received by the user equipment; and
- information about uplink transmit power of the user equipment.

16. The method of claim 14, wherein the method further comprises determining a position of the user equipment, based on the path loss related information.

17. The method of claim 14, wherein the selection of the cell area description further is based on one or more of:
- release information or model information of the user equipment;
- information about UE capabilities of the user equipment;
- transmit power of a base station serving a cell relating to the cell area description; and
- cell selection offset configuration of the user equipment.

18. The method of claim 14, wherein the handling of path loss related information comprises creating a database comprising cell area descriptions and path loss related information associated thereto, wherein each cell area description of the database is associated to a position, wherein the request for path loss related information is related to at least one cell area description of the cell area descriptions, the method further comprising:
- associating the path loss related information to said at least one cell area description, thereby creating the database of cell area descriptions and path loss related information associated thereto.

19. The method of claim 18, wherein each of the cell area descriptions further is associated to information about one or more of:
- release information or model information of a user equipment;
- information about UE capabilities of a user equipment;
- transmit power of a base station serving a cell relating to the cell area description; and
- cell selection offset configuration of a user equipment.

20. The method of claim 18, wherein the database is used for at least one of:
- positioning methods using cell IDs and relying on cell area descriptions;
- fingerprinting positioning; and
- adaptive enhanced cell ID (AECID) based positioning.

21. A positioning node for handling path loss related information to be used by a location service, wherein the positioning node is configured for being comprised in a Long Term Evolution system, the positioning node comprising:
- a transmitter configured to send a request for the path loss related information to a first radio network node comprised in the LTE system and serving a user equipment using a first radio access technology, wherein the request relates to requesting information for use by the location service;
- a receiver configured to receive the path loss related information from the first radio network node, wherein the path loss value is measured with respect to the first radio network node using at least a second radio access technology that is different from the first radio access technology; and
- a processing circuit configured to select a cell area description based on the path loss related information, wherein the cell area description is indicative of information relating to the position of the user equipment.

\* \* \* \* \*